(12) United States Patent
Kim et al.

(10) Patent No.: US 11,924,774 B2
(45) Date of Patent: Mar. 5, 2024

(54) METHOD FOR TRANSMITTING PREFERRED LINK INFORMATION

(71) Applicant: LG Electronics Inc., Seoul (KR)

(72) Inventors: Jeongki Kim, Seoul (KR); Jinsoo Choi, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 255 days.

(21) Appl. No.: 17/409,002

(22) Filed: Aug. 23, 2021

(65) Prior Publication Data

US 2022/0070791 A1    Mar. 3, 2022

(30) Foreign Application Priority Data

Sep. 2, 2020    (KR) ..................... 10-2020-0111787

(51) Int. Cl.
*H04W 52/24*    (2009.01)
*H04L 5/00*    (2006.01)
*H04W 52/36*    (2009.01)

(52) U.S. Cl.
CPC ......... *H04W 52/242* (2013.01); *H04L 5/0048* (2013.01); *H04W 52/367* (2013.01)

(58) Field of Classification Search
CPC .............. H04W 52/242; H04W 52/367; H04L 5/0048; H04L 5/005
See application file for complete search history.

(56) References Cited

U.S. PATENT DOCUMENTS

| | | | |
|---|---|---|---|
| 2010/0265093 A1* | 10/2010 | Cho ..................... | G01S 5/02528 340/8.1 |
| 2017/0238306 A1* | 8/2017 | Patel ..................... | H04W 72/21 370/329 |
| 2021/0352722 A1* | 11/2021 | Xin ........................... | H04L 1/08 |
| 2022/0279375 A1* | 9/2022 | Kim ...................... | H04W 74/00 |

* cited by examiner

*Primary Examiner* — John J Lee
(74) *Attorney, Agent, or Firm* — Fish & Richardson P.C.

(57) ABSTRACT

In a wireless local area network system, an access point (AP) multi-link device (MLD) may receive, from a non-simultaneous transmit and receive (NSTR) station MLD (NSTR STA MLD), STR information related to transmit power information for the NSTR STA MLD to operate in STR. The NSTR STA MLD includes a first STA and a second STA, the first STA operates in a first link, the second STA operates in a second link, and the first and second links have NSTR relationship. The AP MLD may receive, from the NSTR STA MLD, a reference signal to calculate a path loss between the NSTR STA MLD and the AP MLD. The reference signal may include a transmit power value of the reference signal. The AP MLD may determine whether the NSTR STA MLD is capable of operating in STR based on the STR information and the path loss value.

7 Claims, 24 Drawing Sheets

(a)

(b)

(a) STR operation (a) STR operation

METHOD FOR TRANSMITTING PREFERRED LINK INFORMATION

CROSS-REFERENCE TO RELATED APPLICATIONS

Pursuant to 35 U.S.C. § 119 (a), this application claims the benefit of Korean Patent Application No. 10-2020-0111787, filed on Sep. 2, 2020, the contents of which are all hereby incorporated by reference herein in their entirety.

BACKGROUND

Technical Field

The present specification relates to a method for transmitting preferred link information by a multi-link single radio (MLSR) station in a wireless local area network system.

Related Art

A wireless local area network (WLAN) has been enhanced in various ways. For example, the Institute of Electrical and Electronics Engineers (IEEE) 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARD) scheme, or the like, which is newly proposed. The EHT standard may be called the IEEE 802.11be standard.

SUMMARY

In a wireless local area network system according to various embodiments, an access point (AP) multi-link device (MLD) may receive, from a non-simultaneous transmit and receive (NSTR) station MLD (NSTR STA MLD), STR information related to transmit power information for the NSTR STA MLD to operate in STR. The NSTR STA MLD includes a first STA and a second STA, the first STA operates in a first link, the second STA operates in a second link, and the first and second links have NSTR relationship. The AP MLD may receive, from the NSTR STA MLD, a reference signal to calculate a path loss between the NSTR STA MLD and the AP MLD. The reference signal may include a transmit power value of the reference signal. The AP MLD may determine whether the NSTR STA MLD is capable of operating in STR based on the STR information and the path loss value.

According to an example of the present specification, the AP can calculate the path loss with a station based on the information transmitted by the station, and can determine whether the station is capable of operating in STR based on the transmit power information of the station and the path loss.

According to an example of the present specification, the AP can obtain information related to a specific condition under which the NSTR STA can operate in STR from the NSTR STA, and can determine the maximum transmit power value used by the NSTR STA operating in STR. The AP can know the minimum transmit power value used by the NSTR STA in order for the AP to successfully receive a signal based on the path loss value between the NSTR STA and the AP and the UL Target RSSI. The AP can determine whether the NSTR STA can operate in STR and the NSTR STA can transmit a signal that the AP can successfully receive. Based on this, the AP can transmit a trigger frame to instruct that the STA operates in STR.

DESCRIPTION OF EXEMPLARY EMBODIMENTS

Figure 1:
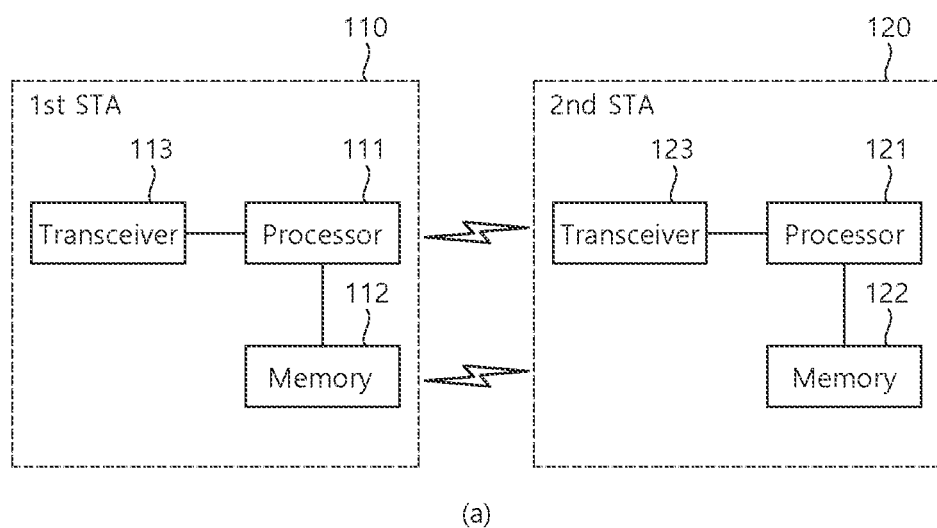
FIG. 1 shows an example of a transmitting apparatus and/or receiving apparatus of the present specification.
Figure 1:
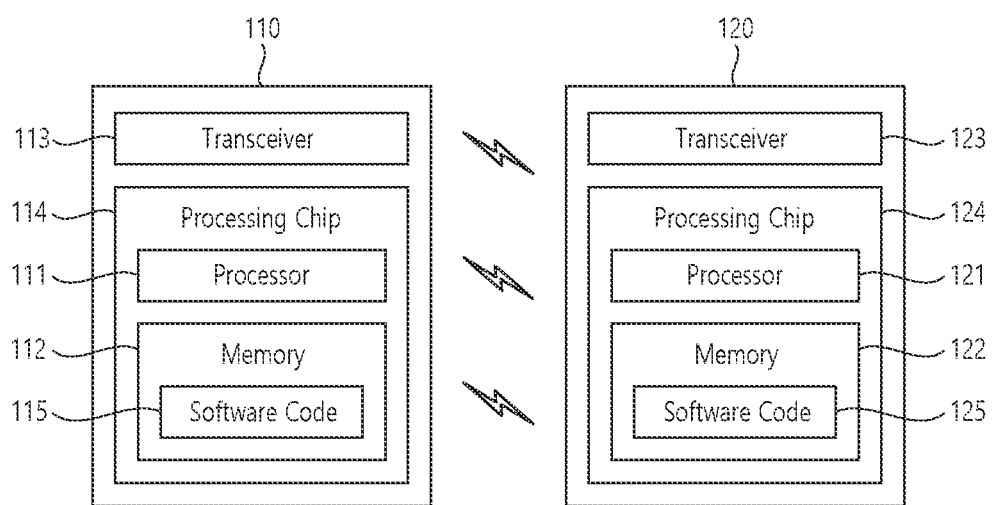

In the present specification, "A or B" may mean "only A", "only B" or "both A and B". In other words, in the present specification, "A or B" may be interpreted as "A and/or B".

For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP. In the present specification, the AP may be indicated as an AP STA.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, an STA1, an STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
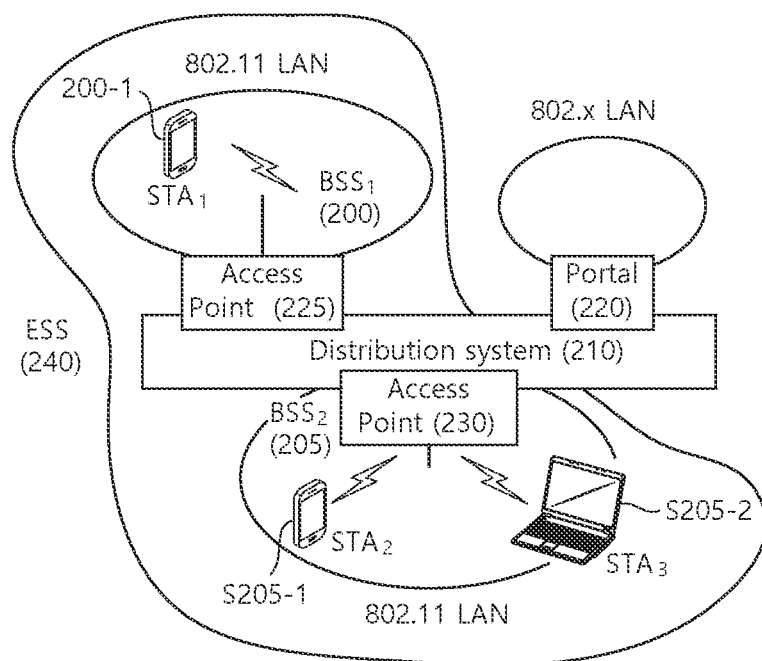
FIG. 2 is a conceptual view illustrating the structure of a wireless local area network (WLAN).
Figure 2:
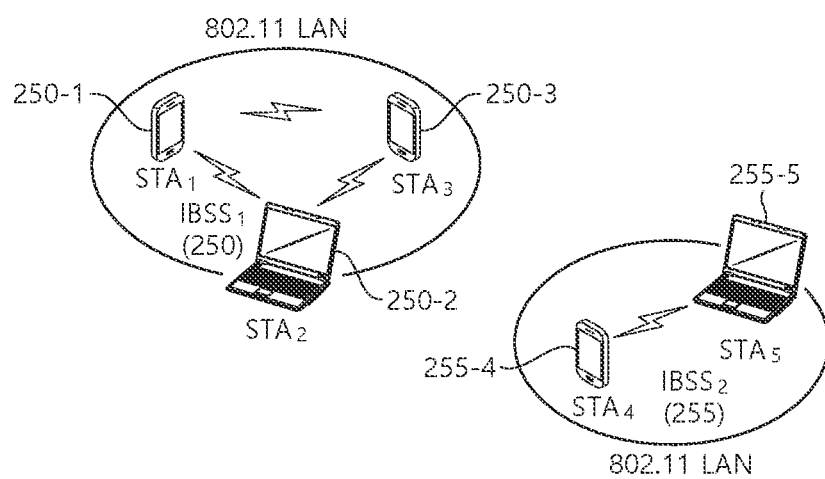

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and an STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
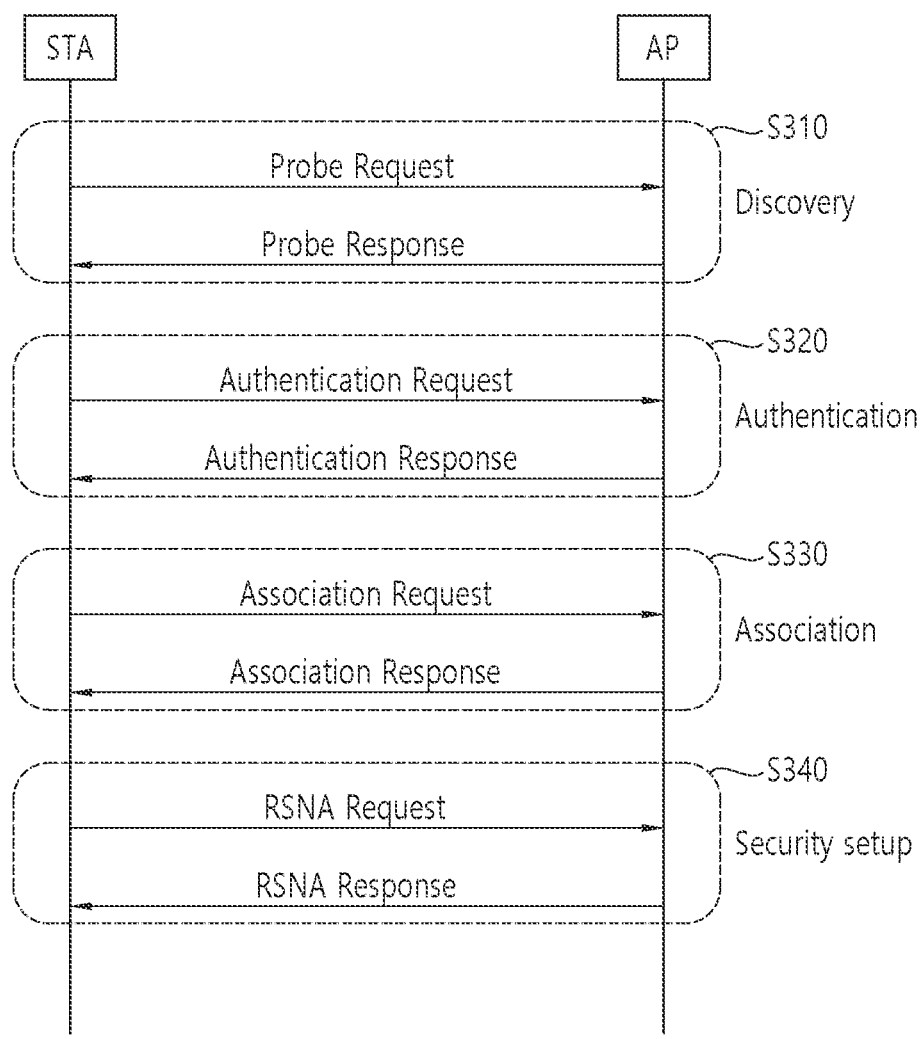
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an MSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
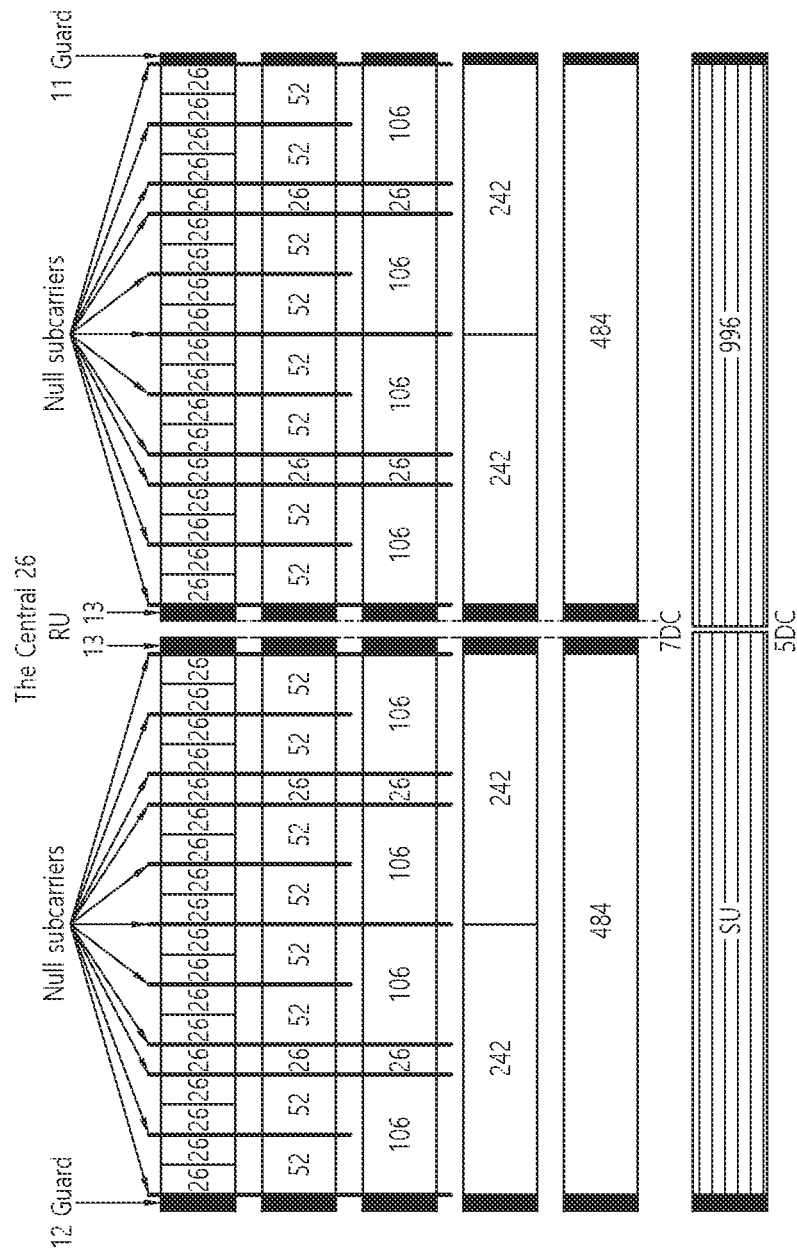
FIG. 4 illustrates a layout of resource units (RUs) used in a band of 80 MHz.

FIG. 4 illustrates a layout of resource units (RUs) used in a band of 80 MHz.

RUs having various sizes such as a 26-RU, a 52-RU, a 106-RU, a 242-RU, a 484-RU, a 996-RU may be used. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

Figure 7:
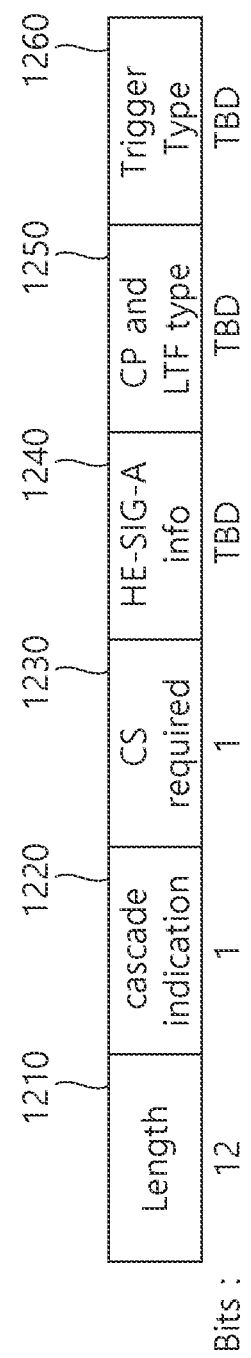
FIG. 7 illustrates an example of a common information field of a trigger frame.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 5:
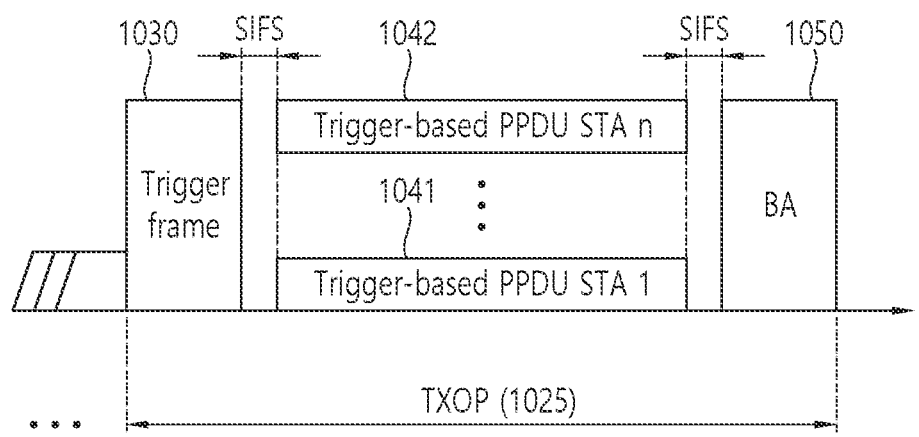
FIG. 5 illustrates an operation based on UL-MU.

FIG. 5 illustrates an operation based on UL-MU. As illustrated, a transmitting STA (e.g., AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 6 to FIG. 8. Even if UL-MU communication is used, an orthogonal frequency division multiple access (OFDMA) scheme or a MU MIMO scheme may be used, and the OFDMA and MU-MIMO schemes may be simultaneously used.

Figure 6:
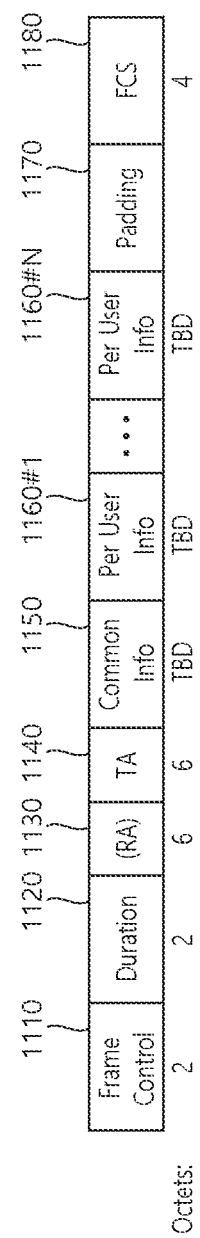
FIG. 6 illustrates an example of a trigger frame.

FIG. 6 illustrates an example of a trigger frame. The trigger frame of FIG. 6 allocates a resource for uplink multiple-user (MU) transmission, and may be transmitted, for example, from Each field shown in FIG. 6 may be partially omitted, and another field may be added. In addition, a length of each field may be changed to be different from that shown in the figure.

A frame control field 1110 of FIG. 6 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of an SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 6 are preferably included. The per user information field may also be called an "allocation field".

In addition, the trigger frame of FIG. 6 may include a padding field 1170 and a frame check sequence field 1180.

Each of the per user information fields 1160 #1 to 1160 #N shown in FIG. 6 may include a plurality of subfields.

FIG. 7 illustrates an example of a common information field of a trigger frame. A subfield of FIG. 7 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS required field 1230 indicates whether a wireless medium state or an NAV or the like is necessarily considered in a situation where a receiving device which has received a corresponding trigger frame transmits a corresponding uplink PPDU.

An HE-SIG-A information field 1240 may include information for controlling content of an SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 8:
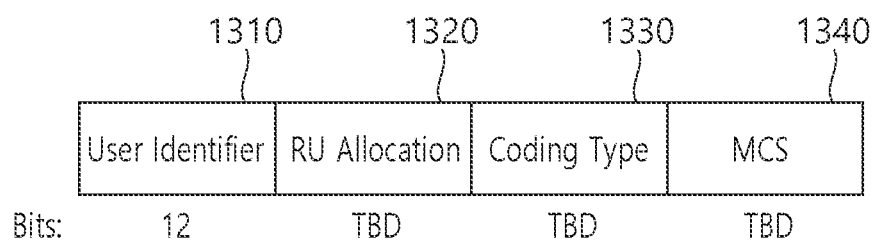
FIG. 8 illustrates an example of a subfield included in a per user information field.

FIG. 8 illustrates an example of a subfield included in a per user information field. A user information field 1300 of FIG. 8 may be understood as any one of the per user information fields 1160 #1 to 1160 #N mentioned above with reference to FIG. 6. A subfield included in the user information field 1300 of FIG. 8 may be partially omitted, and an extra subfield may be added. In addition, a length of each subfield illustrated may be changed.

A user identifier field 1310 of FIG. 8 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 4.

The subfield of FIG. 8 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 8 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a PPDU transmitted/received in a STA of the present specification will be described.

Figure 9:
FIG. 9 illustrates an example of a PPDU used in the present specification.

FIG. 9 illustrates an example of a PPDU used in the present specification.

The PPDU of FIG. 9 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 9 may indicate the entirety or part of a PPDU type used in the EHT system. For example, the example of FIG. 9 may be used for both of a single-user (SU) mode and a multi-user (MU) mode. In other words, the PPDU of FIG. 9 may be a PPDU for one receiving STA or a plurality of receiving STAs. When the PPDU of FIG. 9 is used for a trigger-based (TB) mode, the EHT-SIG of FIG. 9 may be omitted. In other words, a STA which has received a trigger frame for uplink-MU (UL-MU) may transmit the PPDU in which the EHT-SIG is omitted in the example of FIG. 9.

In FIG. 9, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 9 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 9, the L-LTF and the L-STF may be the same as those in the conventional fields.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 9. The U-SIG may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

The common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 6, each user field may be related to MU-MIMO allocation, or may be related to non-MU-MIMO allocation.

The common field of the EHT-SIG may include a CRC bit and a tail bit. A length of the CRC bit may be determined as 4 bits. A length of the tail bit may be determined as 6 bits, and may be set to '000000'.

The common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 9. The PPDU of FIG. 9 may be used to transmit/receive frames of various types. For example, the PPDU of FIG. 9 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 9 may be used for a management frame. An example of the management frame may include a beacon frame, a (re-)association request frame, a (re-)association response frame, a probe request frame, and a probe response frame. For example, the PPDU of FIG. 9 may be used for a data frame. For example, the PPDU of FIG. 9 may be used to simultaneously transmit at least two or more of the control frame, the management frame, and the data frame.

Figure 10:
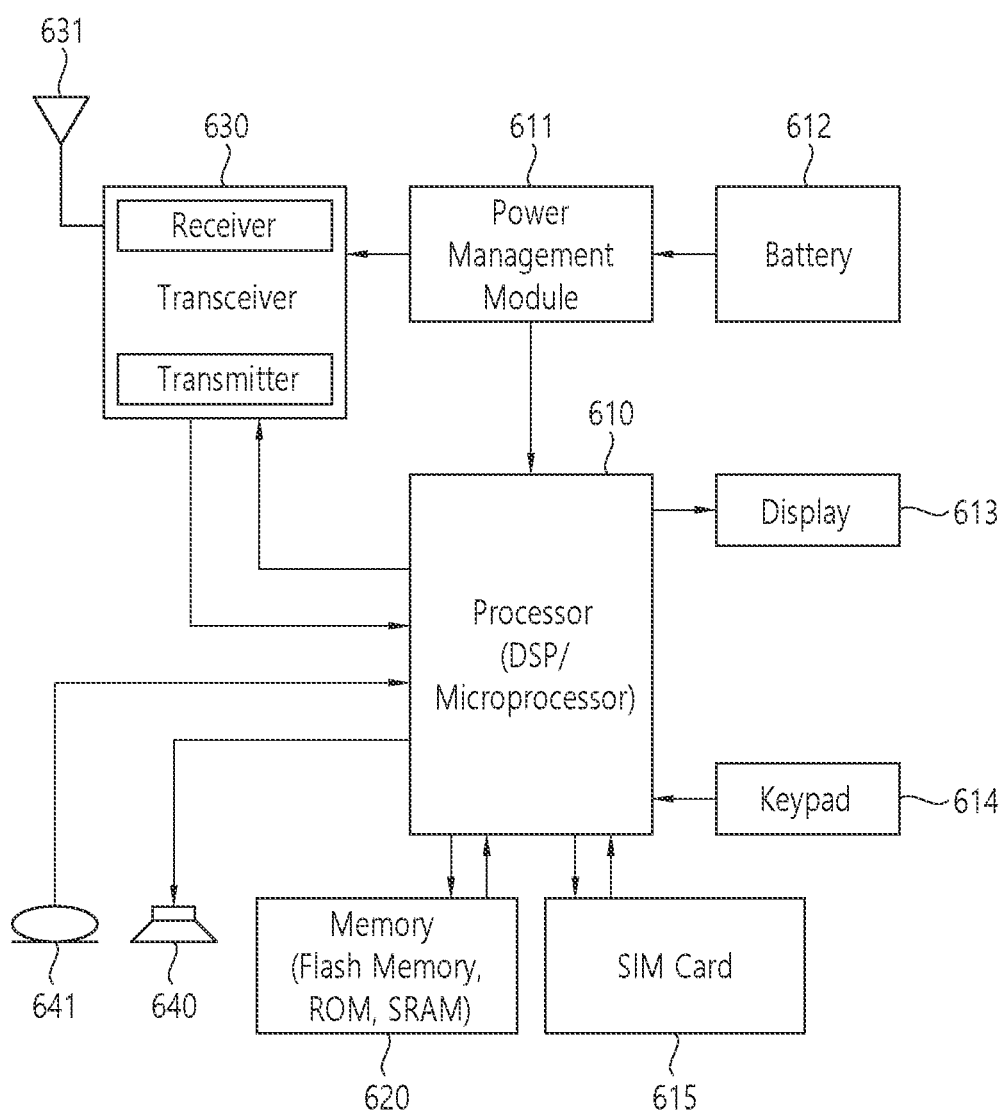
FIG. 10 illustrates an example of a modified transmission device and/or receiving device of the present specification.

FIG. 10 illustrates an example of a modified transmission device and/or receiving device of the present specification.

Each device/STA of the sub-figure (a)/(b) of FIG. 1 may be modified as shown in FIG. 10. A transceiver 630 of FIG. 10 may be identical to the transceivers 113 and 123 of FIG. 1. The transceiver 630 of FIG. 10 may include a receiver and a transmitter.

A processor 610 of FIG. 10 may be identical to the processors 111 and 121 of FIG. 1. Alternatively, the processor 610 of FIG. 10 may be identical to the processing chips 114 and 124 of FIG. 1.

A memory 620 of FIG. 10 may be identical to the memories 112 and 122 of FIG. 1. Alternatively, the memory 620 of FIG. 10 may be a separate external memory different from the memories 112 and 122 of FIG. 1.

Referring to FIG. 10, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 10, a speaker 640 may output a result related to a sound processed by the processor 610. A microphone 641 may receive an input related to a sound to be used by the processor 610.

Hereinafter, technical features for a channel bonding supported by a STA of the present specification will be described.

For example, in IEEE 802.11n system, 40 MHZ channel bonding in which two 20 MHz channels are combined is performed. In addition, in IEEE 802.11ac system, 40/80/160 MHZ channel bonding is performed.

For example, the STA may perform channel bonding for a primary 20 MHz channel (P20 channel) and a secondary 20 MHz channel (S20 channel). A backoff count/counter may be used in the channel bonding process. The backoff count value is chosen as a random value and may be decremented during the backoff interval. In general, as the backoff count value becomes 0, the STA may attempt to access the channel.

The STA performing channel bonding determines whether the S20 channel remains idle during point coordination function interframe space (PIFS) at a time when the backoff count value for the P20 channel becomes 0 since the P20 channel is idle during the backoff interval. If the S20 channel is in the idle state, the STA may perform bonding on both the P20 channel and the S20 channel. That is, the STA may transmit a signal (PPDU) through a 40 MHz channel (i.e. a 40 MHz bonding channel) including a P20 channel and an S20 channel.

Figure 11:
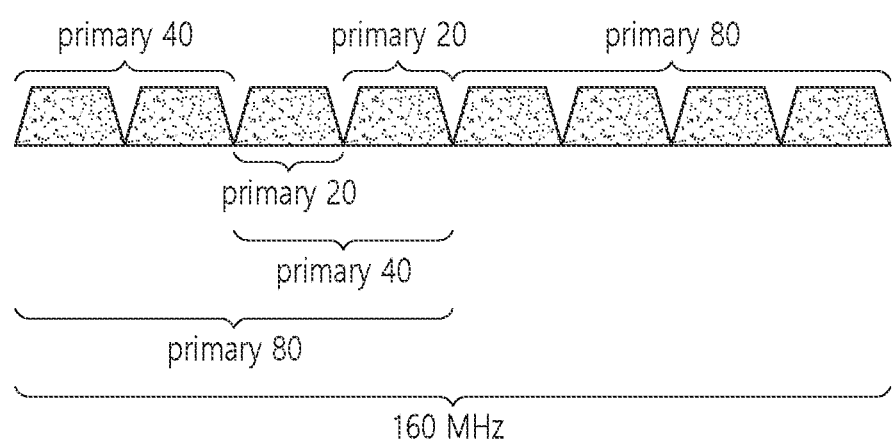
FIG. 11 shows an example of channel bonding.

FIG. 11 shows an example of channel bonding. As shown in FIG. 11, the primary 20 MHz channel and the secondary 20 MHz channel may become a 40 MHz channel (primary 40 MHz channel) through channel bonding. That is, the bonded 40 MHz channel may include a primary 20 MHz channel and a secondary 20 MHz channel.

Channel bonding may be performed when a channel contiguous to the primary channel is in the idle state. That is, the primary 20 MHz channel, the secondary 20 MHz channel, the secondary 40 MHz channel, and the secondary 80 MHz channel can be sequentially bonded. When it is determined that the secondary 20 MHz channel is in the busy state, bonding may not be performed although other secondary channels are in the idle state. In addition, when it is determined that the secondary 20 MHz channel is in the idle state and the secondary 40 MHz channel is in the busy state, channel bonding may be performed only on the primary 20 MHz channel and the secondary 20 MHz channel.

Hereinafter, preamble puncturing supported by the STA of this specification will be described.

For example, in the example of FIG. 11, if the primary 20 MHz channel, the secondary 40 MHz channel, and the secondary 80 MHz channel are all in the idle state, but the secondary 20 MHz channel is in the busy state, the secondary 40 MHz channel and the secondary 80 MHz channel Bonding may not be possible. In this case, the STA configures a 160 MHz PPDU and a preamble (e.g. L-STF, L-LTF, L-SIG, RL-SIG, U-SIG, HE-SIG-A, HE-SIG-B, HE-STF, HE-LTF, EHT-SIG, EHT-STF, EHT-LTF, etc.) transmitted through the secondary 20 MHz channel may be punctured to transmit a signal through a channel in an idle state. In other words, the STA may perform preamble puncturing for some bands of the PPDU. Information on preamble puncturing (for example, information on 20/40/80 MHz channel/band to which puncturing is applied) may be included in a signal field (e.g. HE-SIG-A, U-SIG, EHT-SIG) of the PPDU.

Hereinafter, technical features for multi-link (ML) supported by the STA of the present specification will be described.

A STA (AP and/or non-AP STA) of the present specification may support ML communication. ML communication may mean communication supporting a plurality of links. Links related to ML communication may include at least one channel of a 2.4 GHz band, a 5 GHz band, and a 6 GHz band (e.g. 20/40/80/160/240/320 MHz channels).

Hereinafter, technical features for multi-link (ML) supported by the STA of the present specification will be described.

A STA (AP and/or non-AP STA) of the present specification may support ML communication. ML communication may mean communication supporting a plurality of links. Links related to ML communication may include at least one channel of a 2.4 GHz band, a 5 GHz band, and a 6 GHz band (e.g. 20/40/80/160/240/320 MHz channels).

A plurality of links used for ML communication may be configured in various ways. For example, a plurality of links supported by one STA for ML communication may include a plurality of channels in a 2.4 GHz band, a plurality of channels in a 5 GHz band, and/or a plurality of channels in a 6 GHz band. Alternatively, a plurality of links supported by one STA for ML communication includes a combination of at least one channel in the 2.4 GHz band (or 5 GHz/6 GHz band) and at least one channel in the 5 GHz band (or 2.4 GHz/6 GHz band). Meanwhile, at least one of a plurality of links supported by one STA for ML communication may be a channel to which preamble puncturing is applied.

STA may perform ML setup to perform ML communication. ML setup may be performed based on a management frame such as Beacon, Probe Request/Response, Association Request/Response or a control frame. For example, information related to ML configuration may be included in an element field included in Beacon, Probe Request/Response, and Association Request/Response.

When ML setup is completed, an enabled link for ML communication may be determined. The STA may perform frame exchange through at least one of a plurality of links determined as an enabled link. For example, the enabled link may be used for at least one of a management frame, a control frame and a data frame.

When one STA supports a plurality of links, a transceiver supporting each link may operate as one logical STA. For example, one STA supporting two links may be expressed as one multi-link device (MLD) including a first STA for a first link and a second STA for a second link. For example, one AP supporting two links may be expressed as one AP MLD including a first AP for a first link and a second AP for a second link. In addition, one non-AP supporting two links may be expressed as one non-AP MLD including a first STA for the first link and a second STA for the second link.

Hereinafter, more specific features related to ML setup are described.

MLD (AP MLD and/or non-AP MLD) may transmit information related to a link that the corresponding MLD can support through ML setup. Link information may be configured in various ways. For example, information about the link includes at least one of 1) information on whether the MLD (or STA) supports simultaneous RX/TX operation, 2) information about the number/upper limit of uplink/downlink links supported by the MLD (or STA), 3) information about the location/band/resource of the uplink/downlink link supported by the MLD (or STA), 4) information about the type (management, control, data etc.) of frame available or preferred in at least one uplink/downlink link, 5) information about available or preferred ACK policy in at least one uplink/downlink link, and/or 6) information about available or preferred TID (traffic identifier) in at least one uplink/downlink link. The TID is related to the priority of traffic data and is expressed as eight types of values according to the conventional WLAN standard. That is, eight TID values corresponding to four access categories (ACs) (AC_BK (background), AC_BE (best effort), AC_VI (video), and AC_VO (voice)) according to the conventional WLAN standard can be defined.

For example, it may be configured in advance that all TIDs for uplink/downlink link are mapped. Specifically, if negotiation is not made through ML setup, all TIDs are used for ML communication. If mapping between uplink/downlink link and TID is negotiated through additional ML setup, the negotiated TID is used for ML communication.

A plurality of links that can be used by the transmitting MLD and the receiving MLD related to ML communication may be configured through ML setup, and this may be referred to as an "enabled link". The "enabled link" may be called differently in various expressions. For example, it may be referred to as various expressions such as a first link, a second link, a transmission link, and a reception link.

After the ML setup is completed, the MLD may update the ML setup. For example, the MLD may transmit information about a new link when it is necessary to update information about the link. Information related to the new link may be transmitted based on at least one of a management frame, a control frame, and a data frame.

In extreme high throughput (EHT) which is a standard being discussed after IEEE802.11ax, the introduction of HARQ is being considered. When HARQ is employed, coverage can be widened in a low signal to noise ratio (SNR) environment, that is, in an environment where the distance between the transmitting terminal and the receiving terminal is long, and higher throughput can be obtained in a high SNR environment.

The device described below may be the apparatus of FIGS. 1 and/or 10, and the PPDU may be the PPDU of FIG. 9. The device may be an AP or a non-AP STA. The device described below may be an AP multi-link device (MLD) supporting multi-link or a non-AP STA MLD.

In EHT which is a standard being discussed after 802.11ax, a multi-link environment using one or more bands simultaneously is being considered. When the device supports multi-link or multi-link, the device may use one or more bands (e.g., 2.4 GHz, 5 GHz, 6 GHz, 60 GHz, etc.) simultaneously or alternately.

Hereinafter, although described in the form of a multi-link, the frequency band may be configured in various other forms. Although terms such as multi-link and multi-link may be used in this specification, some embodiments may be described based on multi-link for convenience of description below.

In the following specification, MLD means a multi-link device. The MLD has one or more connected STAs and has one MAC service access point (SAP) that passes through an upper link layer (Logical Link Control (LLC)). The MLD may mean a physical device or a logical device. Hereinafter, a device may mean an MLD.

In the following specification, a transmitting device or a receiving device may mean an MLD. The first link of the receiving/transmitting device may be a terminal (e.g., STA or AP) that performs signal transmission/reception through the first link and is included in the receiving/transmitting device. The second link of the receiving/transmitting device may be a terminal (e.g., STA or AP) that performs signal transmission/reception through the second link and is included in the receiving/transmitting device.

IEEE 802.11be can support mainly two types of multi-link operation. For example, simultaneous transmit and receive (STR) and non-STR operations may be considered. For example, an STR may be referred to as an asynchronous multi-link operation, and a non-STR may be referred to as a synchronous multi-link operation. A multi-link may include a multi-band. That is, the multi-link may mean a link included over several frequency bands, or may mean a plurality of links included in one frequency band.

EHT (IEEE 802.11be) considers multi-link technology, where multi-link may include multi-band. That is, the multi-link can represent links of several bands and can represent multiple multi-links within one band at the same time. Two types of multi-link operation are being considered. The capability that enables simultaneous reception and transmission in multiple links is called STR. It may be called that links with STR capability have STR relationship, and links that do not have STR capability have non-STR relationship.

Figure 12:
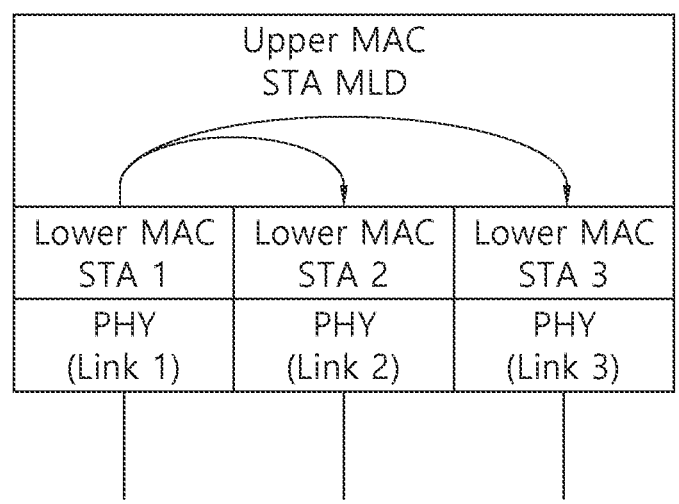
FIG. 12 is a diagram illustrating an embodiment of a device supporting multi-link.

FIG. 12 is a diagram illustrating an embodiment of a device supporting multi-link.

Referring to FIG. 12, a multi-link device (MLD) may have three links. Each STA has a lower MAC and a PHY layer, and can be coordinated through an Upper MAC. That is, STA1 may share various information such as status, operation, and collected data in link 1, etc. to STA2 and STA3 through the Upper MAC.

Considering that TX/RX is not possible at the same time in multiple links, that is, STR MLD (or MLD with constraints), this MLD only supports TX/TX and RX/RX through multi-link aggregation. That is, simultaneous reception or simultaneous transmission is possible on a plurality of links, but reception/transmission cannot be performed on other links during transmission/reception on some links. The meaning of multi-link aggregation may be as follows.

Figure 13:
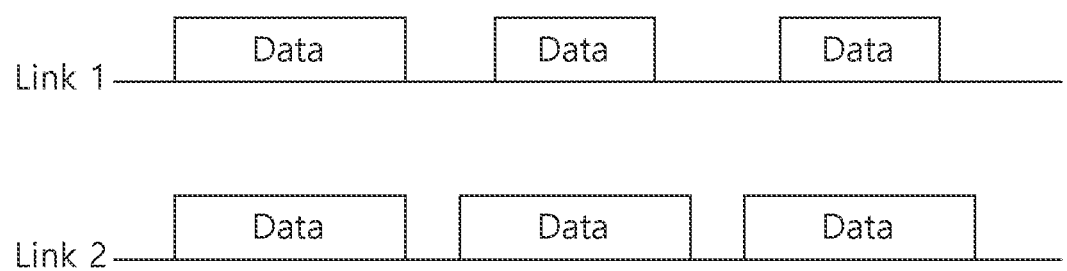
FIG. 13 is a diagram illustrating an embodiment of multi-link aggregation.

FIG. 13 is a diagram illustrating an embodiment of multi-link aggregation.

Referring to FIG. 13, the MLD may transmit the PPDU with a certain margin or with aligning the start and/or end of the PPDU at each link for TX/TX or RX/RX. It may be difficult to align the start of the PPDU with a small margin through random backoff at each link. In addition, the aggregation method may vary according to the level of coordination that shares information between STAs at each link.

As mentioned above, a terminal having a non-STR (or constraints STR) has lower resource efficiency than a terminal having a STR (non-constraints STR) because DL/UL is not possible in both links. For example, when a DL frame is received through one link, UL transmission to the other link cannot be performed.

The present specification proposes a method for solving this problem.

Capability for coordination of each MLD may be transmitted in the form of element or field in the ML setup process (including discovery, association, etc.). Also, even if ML aggregation coordination capability is negotiated in the setup phase, the corresponding coordination level information can be updated through the control field after setup is completed.

For immediate ML aggregation, one link needs to know the channel state in the other link and a PPDU needs to be sent immediately through both links. Therefore, it is necessary to negotiate the capability of whether the channel state can be shared immediately, that is, whether immediate aggregation is possible.

Coordination Capability for Aggregation: Whether inter-link aggregation is possible. In addition, conditions for availability may be added. For example, an MLD may indicate whether multi-link aggregation is possible by attaching conditions such as whether multi-link aggregation is possible in one slot, whether multi-link aggregation is possible within SIFS, and whether multi-link aggregation is possible immediately, etc.

Ex 1) 1: Yes, 0: No

Ex 2) It can also be expressed as time rather than simply possible.

For example, '0' denotes that multi-link aggregation is immediately possible, and '1' denotes that at least one slot time is required.

The reason that the two links of the MLD become non-STR is that uplink transmission in one link interferes with downlink reception in the other link since the two links are adjacent.

One way to solve this is to reduce the internal interference by shooting less power than the original power, or to increase the interval between the transmission bandwidths of the two links.

Figure 14:
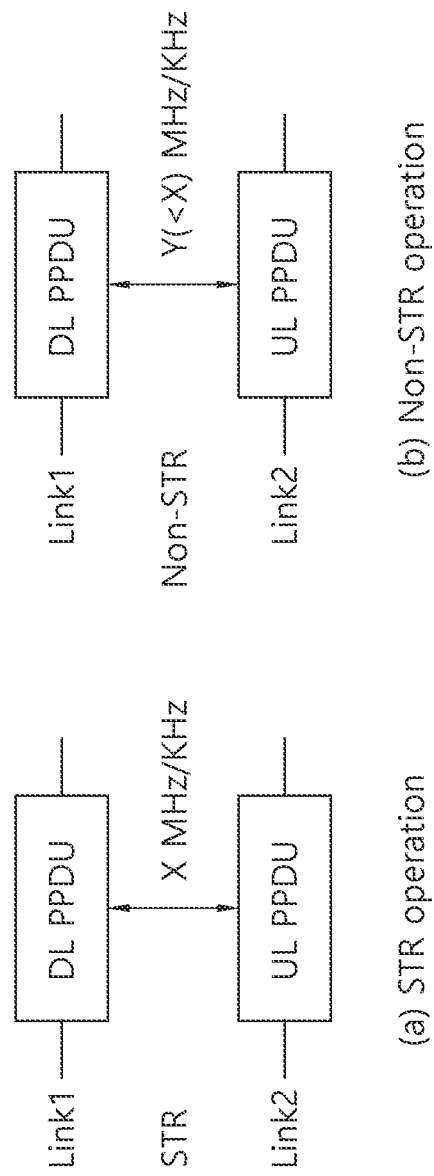
FIG. 14 is a diagram illustrating an embodiment of STR and non-STR operations.

FIG. 14 is a diagram illustrating an embodiment of STR and non-STR operations.

Referring to FIG. 14, the subfigure (a) shows a case in which Link 1 and Link2 are capable of STR operation, and the subfigure (b) shows a case in which Link1 and Link2 operate as non-STR. In order to operate in STR, the two links must be at least X MHz (/KHz/Hz) apart. However, in subfigure (b), since the two links are separated by a bandwidth smaller than X (i.e., by Y), STR cannot be operated but non-STR operation is enabled. These characteristics may be different for each terminal, and the AP cannot know the value of X of the terminal until the terminal informs it. In addition, the value of X MHz (/KHz) that determines the STR is related to the transmit power of the terminal. For example, it is assumed that STR operation is possible when the terminal transmits with its maximum power and the distance between links is X MHz or more. Even if the distance between the two links is less than X by Y MHz, the terminal may perform STR operation by reducing the transmit (TX) power of the terminal.

For this operation, information that links operating in non-STR at maximum TX power is changed into links operating in STR (for example, distance between two links, related power values) can be transmitted to the AP (/AP MLD) by a non-AP STA (/MLD).

At this time, the distance information between the two links may be determined as one of the following information, but may be expressed in various ways. The distance may mean a distance between a DL PPDU and a UL PPDU transmitted in two links or a distance between center frequencies of PPDUs transmitted in two links.

Figure 15:
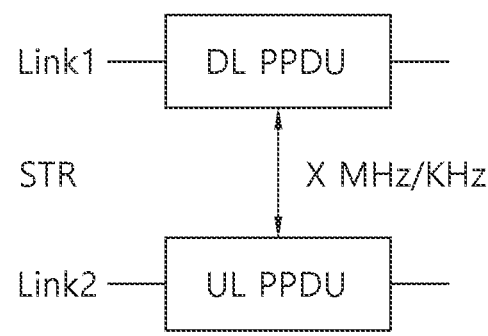
FIG. 15 is a diagram illustrating an embodiment of an STR operation.

FIG. 15 is a diagram illustrating an embodiment of an STR operation.

Referring to FIG. 15, the distance from the nearest end of the DL PPDU to the nearest end of the UL PPDU may be defined as X MHz. X represents a frequency interval in which links can operate in STR with maximum power (or average power) of the terminal. Conversely, the transmit power means the maximum transmit power that can operate in STR at a corresponding distance. Table 1 below shows an example for this.

TABLE 1

| Distance (e.g., MHz) | STA's TX power (dB/dBm) |
| --- | --- |
| A1 | B1 |
| A2 | B2 |
| A3 | B3 |
| A4 | B4 |
| A5 | B5 |
| A6 | B6 |
| . . . | . . . |

An MLD having a non-STR link pair (hereinafter, non-STR MLD) can transmit by selecting one or more of (A1, B1), (A2, B2), (A3, B3), . . . . For example, when the non-STR MLD transmits with only (A1, B1), the AP may derive a combination of (A2, B2), (A3, B3), . . . through calculation and use it.

A STA's TX power may have an absolute value, and may indicate a relative value. When the relative value is expressed, the TX power may represent the difference from the maximum transmit power of the terminal.

The figure below shows an example of the distance between the center frequencies considering the bandwidths between the two links.

Figure 16:
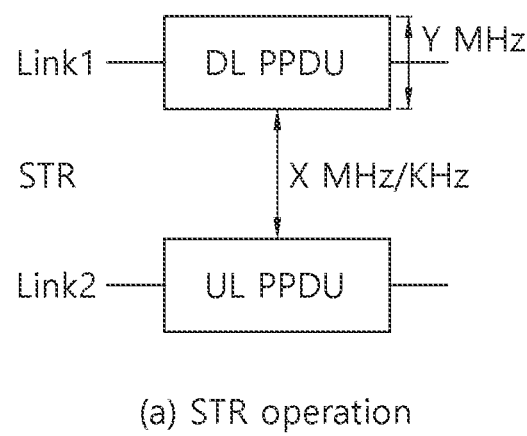
FIG. 16 is a diagram illustrating an embodiment of an STR operation.

FIG. 16 is a diagram illustrating an embodiment of an STR operation.

A distance may indicate the distance (X MHz) between center frequencies of the PPDUs transmitted between the two links, and is related to the bandwidth (Y MHz) of the PPDU and the UL TX power (Z dB/dBm). The TX power means the maximum TX power that can operate in STR at the corresponding distance and PPDU bandwidth. Table 2 below shows an example for this.

TABLE 2

| Distance (e.g., MHz) | STA's TX power (dB/dBm) | PPDU bandwidth (MHz) |
| --- | --- | --- |
| A1 | B1 | C1 |
| A2 | B2 | C2 |
| A3 | B3 | C3 |
| A4 | B4 | C4 |
| A5 | B5 | C5 |
| A6 | B6 | C6 |
| . . . | . . . | . . . |

A Non-STR MLD can transmit by selecting one or more of (A1, B1, C1), (A2, B2, C2), (A3, B3, C3), . . . . For example, if only one (A1, B1, C1) is sent, the AP derives a combination of (A2, B2, C2), (A3, B3, C3), . . . and utilizes it.

Also, A1, A2, A3, A4, . . . may have the same value, B1, B2, B3, B4, . . . may also have the same value, and C1, C2, C3, C4, . . . can also have the same value.

A MLD can inform possible combinations of STR (i.e., combination of power and bandwidth) based on the distance of the center frequency offset of the two links, the TX power of the terminal, and the bandwidth of the PPDU transmitted in each link. If the location of each bandwidth (e.g., 20 MHz, 40 MHz, 80 MHz, 160 (or 80+80) MHz, 240 (or, 160+80) MHz, 320 MHz (or 160+160 MHz), etc.) is fixed in each link, the distance value of the center frequency for the two links can be omitted, and the combination of TX power and PPDU bandwidth of the terminal can inform possible combinations of STR. That is, the distance can be derived only based on the information of the PPDU bandwidth. Table 3 below shows an example for this.

TABLE 3

| STA's TX power (dB/dBm) | PPDU bandwidth (MHz) |
| --- | --- |
| B1 | C1 |
| B2 | C2 |
| B3 | C3 |
| B4 | C4 |
| B5 | C5 |
| B6 | C6 |
| . . . | . . . |

The table below shows an example when each value has a different value.

TABLE 4

| STA's TX power (dB/dBm) | PPDU bandwidth (MHz) |
| --- | --- |
| B1 | C1 |
| B1 | C2 |
| . . . | . . . |
| B2 | D1 |
| B2 | D2 |
| . . . | . . . |
| B3 | E1 |
| B3 | E2 |
| . . . | . . . |

The table below shows a detailed example of this.

TABLE 5

| PPDU bandwidth for two links (MHz) | STA's TX power (dB/dBm) for enabling STR operation |
| --- | --- |
| 320 + 320 | X1 |
| 320 + 160 | X2 |
| 160 + 320 | X3 |
| 160 + 160 | X4 |
| 160 + 80 | X5 |
| 160 + 40 | X6 |
| . . . | . . . |

Tables 3 to 5 show examples, and combinations are possible in other forms. Also, depending on the PPDU bandwidth combination, the values of X1, X2, X3, . . . may have the same value, and one of them may indicate the maximum power of the terminal. The TX power may indicate a maximum transmit power value that links can operate in STR at the corresponding PPDU bandwidth.

Indexes for PPDU bandwidth combinations between two links may be defined.

PPDU bandwidth combination indexes between two links
0: 320 MHz (Link 1)+320 MHz (Link 2)
1: 320 MHz (Link 1)+160 MHz (Link 2)
2: 320 MHz (Link 1)+80 MHz (Link 2)
3: 320 MHz (Link 1)+40 MHz (Link 2)
4: 320 MHz (Link 1)+20 MHz (Link 2)
5: 160 MHz (Link 1)+320 MHz (Link 2)
6: 160 MHz (Link 1)+160 MHz (Link 2)
7: 160 MHz (Link 1)+80 MHz (Link 2)
8: 160 MHz (Link 1)+40 MHz (Link 2)
9: 160 MHz (Link 1)+20 MHz (Link 2)
10: 80 MHz (Link 1)+320 MHz (Link 2)
11: 80 MHz (Link 1)+160 MHz (Link 2)
12: 80 MHz (Link 1)+80 MHz (Link 2)
13: 80 MHz (Link 1)+40 MHz (Link 2)
14: 80 MHz (Link 1)+20 MHz (Link 2)
15: 40 MHz (Link 1)+320 MHz (Link 2)
16: 40 MHz (Link 1)+160 MHz (Link 2)
17: 40 MHz (Link 1)+80 MHz (Link 2)
18: 40 MHz (Link 1)+40 MHz (Link 2)
19: 40 MHz (Link 1)+20 MHz (Link 2)
20: 20 MHz (Link 1)+320 MHz (Link 2)
21: 20 MHz (Link 1)+160 MHz (Link 2)
22: 20 MHz (Link 1)+80 MHz (Link 2)
23: 20 MHz (Link 1)+40 MHz (Link 2)
24: 20 MHz (Link 1)+20 MHz (Link 2) . . . .

As described above, various bandwidth combination of the two links may be configured, and other combinations (e.g., 80+80, 160+160, etc.) may be added or deleted. For example, bandwidth combinations of two or more links may be defined, other combinations not specified above may also be defined, and the bandwidth combination is not limited to the above embodiment.

Indexes for the TX power of the STA (or MLD) (STA's TX power index subfield, for example, 7 bits) may be configured as shown in the table below.

The resolution of the STA's TX power index subfield in the User Info field may be 1 dB.

TABLE 6

| STA's TX power index subfield (e.g., 7bits) | Description |
|---|---|
| 0-90 | Values 0 to 90 map to −110 dBm to −20 dBm |
| 91-126 | Reserved |
| 127 | Indicates to the STA to transmit an HE TB PPDU response at its maximum TX power for the assigned HE-MCS. |

The size of the index field mentioned above, the resolution value (1 dB), or the value mapped to index 0-90 is an example, and these fields may have different values or a range of other values.

For example,
Size of Index field: 4, 5, 6, or 8 bits
Resolution value: 2 or 5 dB
Index range: 0~64 or 0~32 or 0~120
Mapped power value (assuming the index range is 0 to 90): −100 dBm to −30 dBm or, −90 dBm to −40 dBm, or −80 dBm to −50 dBm The above-mentioned values are examples and may have other values.

For example, the STA may inform a value of a UL Target received signal strength indicator (RSSI) for the STR instead of announcing the TX power for the STR. That is, when the terminal transmits a frame using the changed power available for the STR, the frame may indicate the expected UL Target RSSI at which the AP receives the frame. The AP may utilize the corresponding value when setting the UL Target RSSI for each terminal in the Trigger frame.

The terminal may inform the AP of whether the terminal operates in STR at which a TX power index in which bandwidth index as a combination of the above two indexes (bandwidth combination index and STA's TX power index). At this time, one or more combinations of bandwidth and TX power may be included.

Figure 17:
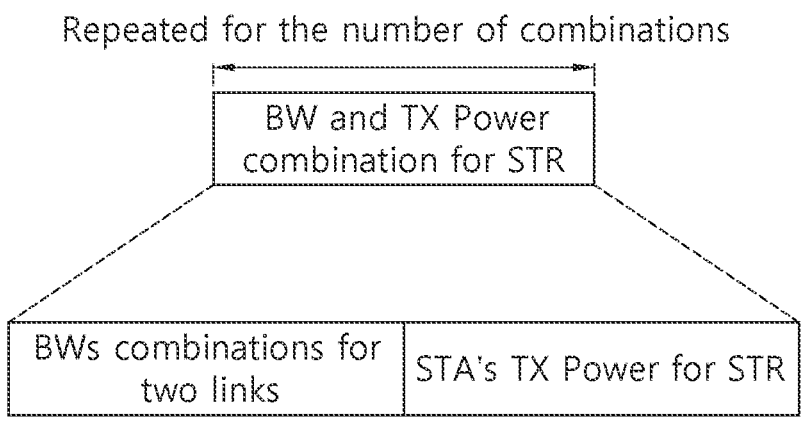
FIG. 17 is a diagram showing an example of information for STR operation.

FIG. 17 is a diagram showing an example of information for STR operation.

Referring to FIG. 17, the bandwidth (BW) and TX Power combination for STR field transmitted by the non-STR MLD to the AP MLD may be repeated as many as the number of combinations of BW and TX Power.

A specific value in the BW combination index may have the meaning as in Table 7 below.

TABLE 7

| BW combination Index for two Links | Value | Descriptions (for BW combinations) |
|---|---|---|
| 0 | 320 MHz (Link1), 320 MHz (Link2) | 320 MHz (Link1), 320 MHz (Link2) |
| 1 | 320 MHZ (Link1), 160 MHz (Link2) | 320 MHz (Link1), 160 MHz (Link2) |
| ... | ... | ... |
| X1 | <=40 MHz (Link1) + 40 MHz (Link2) | (40 MHz, 40 MHz), (40 MHz, 20 MHz), (20 MHz, 40 MHz), (20 MHz, 20 MHz), |

TABLE 7-continued

| BW combination Index for two Links | Value | Descriptions (for BW combinations) |
|---|---|---|
| X2 | <=80 MHz (Link1) + 80 MHz (Link2) | <40 MHz (Link1) + 40 MHz (Link2), and (80 MHz, 20 MHz), (80 MHz, 40 MHz), (80 MHz, 80 MHz), (40 MHz, 80 MHz), (20 MHz, 80 MHz) |
| X3 | <=160 MHz (Link1) + 160 MHz (Link2) | <80 MHz (Link1) + 80 MHz (Link2), and (160 MHz, 20 MHz), (160 MHz, 40 MHz), (160 MHz, 80 MHz), (160 MHz, 160 MHz), (80 MHz, 160 MHz), (40 MHz, 160 MHz), (20 MHz, 160 MHz), |
| ... | ... | ... |
| Y1 | 40 MHz (Link1) + 40 MHz (Link2) < BW combinations <=80 MHz (Link1) + 80 MHz (Link2) | (80 MHZ, 20 MHz), (80 MHz, 40 MHz), (80 MHz, 80 MHz), (40 MHz, 80 MHz), (20 MHz, 80 MHz) |
| Y2 | 80 MHz (Link1) + 80 MHz (Link2) < BW combinations <=160 MHz (Link1) + 160 MHz (Link2) | (160 MHz, 20 MHz), (160 MHz, 40 MHz), (160 MHz, 80 MHz), (160 MHz, 160 MHz), (80 MHz, 160 MHz), (40 MHz, 160 MHz), (20 MHz, 160 MHz), |
| ... | ... | ... |

That is, a specific index value may include all lower bandwidth combinations for the corresponding bandwidth combination or include bandwidth combinations of a specific range. The same TX power may be used for bandwidths in a specific range.

The above is an example shown to explain the proposal of the present specification, and may be described differently.

Figure 18:
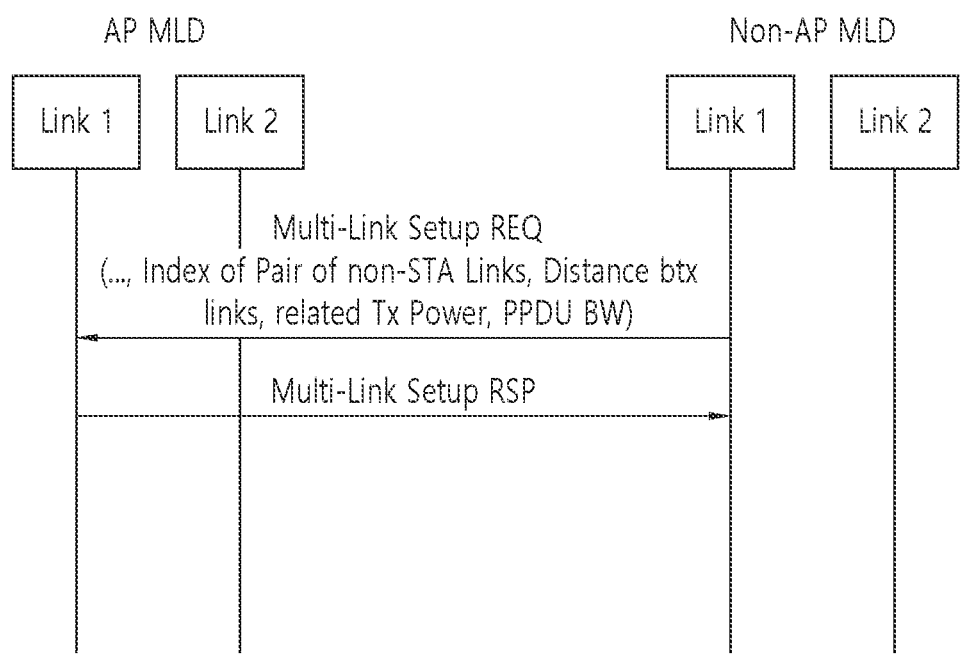
FIG. 18 is a diagram illustrating an embodiment of a multi-link setup operation.

The above information may be transmitted in various frame types, and may be included in the Association Request frame, Multi-link Setup Request frame, new management frame, or public action frame. Instead of the management frame, the corresponding information may be transmitted through an A-Control field (e.g., HE A-Control field) of the Control frame or QoS Data/Null frame. FIG. 18 shows an example of sending the above information through a multi-link setup procedure.

FIG. 18 is a diagram illustrating an embodiment of a multi-link setup operation.

Referring to FIG. 18, the Non-AP MLD (or STA) may transmit a Multi-link Setup Request frame to the AP. The Multi-link Setup Request frame may include a pair index for each pair of non-STR link pairs, a distance between links, a maximum TX power for STR transmission, and related PPDU BW information. The distance information may be different depending on TX power and PPDU BW information, and information on them may be included and transmitted, and Table 8 below shows an example of this.

TABLE 8

| Information of Links pair | Power (dB/dBm) | Bandwidth (MHz) | Distance (MHz) |
|---|---|---|---|
| A1 | B1 | C1 | D1 |
| A1 | B1 | C2 | D2 |
| A1 | B2 | C1 | D3 |

TABLE 8-continued

| Information of Links pair | Power (dB/dBm) | Bandwidth (MHz) | Distance (MHz) |
|---|---|---|---|
| A1 | B2 | C2 | D4 |
| A2 | B1 | C1 | D5 |
| A2 | B1 | C2 | D6 |
| ... | ... | ... | ... |

The above example shows that four combinations (power, bandwidth, distance) are configured for one link pair (e.g., A1).

Figure 19:
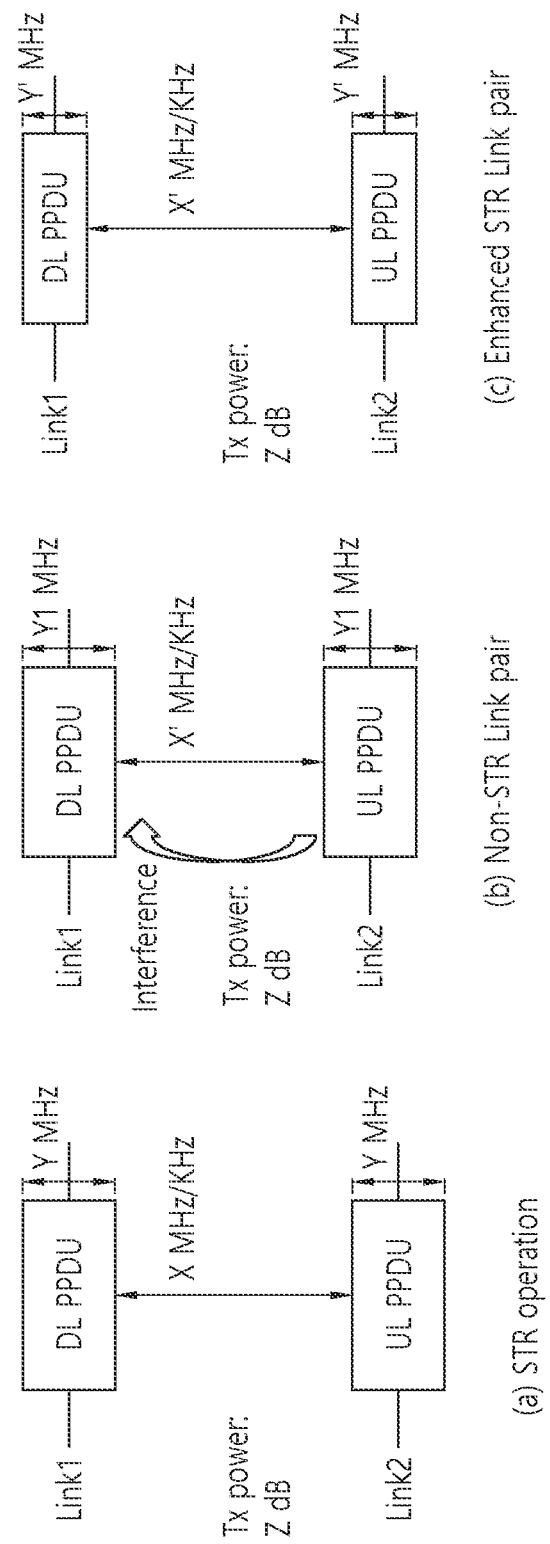
FIG. 19 is a diagram showing an embodiment of an enhanced STR link pair.

If the terminal knows the above information, when attempting to transmit in the one link corresponding to the non-STR while receiving the DL PPDU on other link, the terminal can determine that the distance between the PPDUs transmitted and received on the two links is capable of STR operation and can attempt UL frame transmission. FIG. 19 shows an example for this.

FIG. 19 is a diagram showing an embodiment of an enhanced STR link pair.

Referring to FIG. 19, the subfigure (a) shows the distance X between the two links and PPDU BW Y MHz that satisfy the STR when the terminal transmits with maximum (or average) power (i.e., Z dB). However, if the link selected through the multi-link setup procedure is configured as a non-STR link pair as in the subfigure (b), the distance between the two links when transmitting at maximum (or average) power (Z dB) in Y1 MHz bandwidth is X' MHz which is less than X MHz, resulting that the link pair in the subfigure (b) operates in non-STR. However, in the situation as the subfigure (c), when Z' dB Tx power and Y' MHz bandwidth are used, the terminal can operate in STR with X' MHz distance, and can report to the AP using the above-mentioned method. These combinations (power, bandwidth, distance) can be achieved by using various combinations (for example, (Z1, Y1, X1), (Z1, Y2, X2), etc.) as mentioned above in addition to (Z', Y', X').

In the above example, the distance between the two links is taken as the distance between the ends of the two PPDUs, but as mentioned above, the distance of the center frequency may be used.

Figure 20:
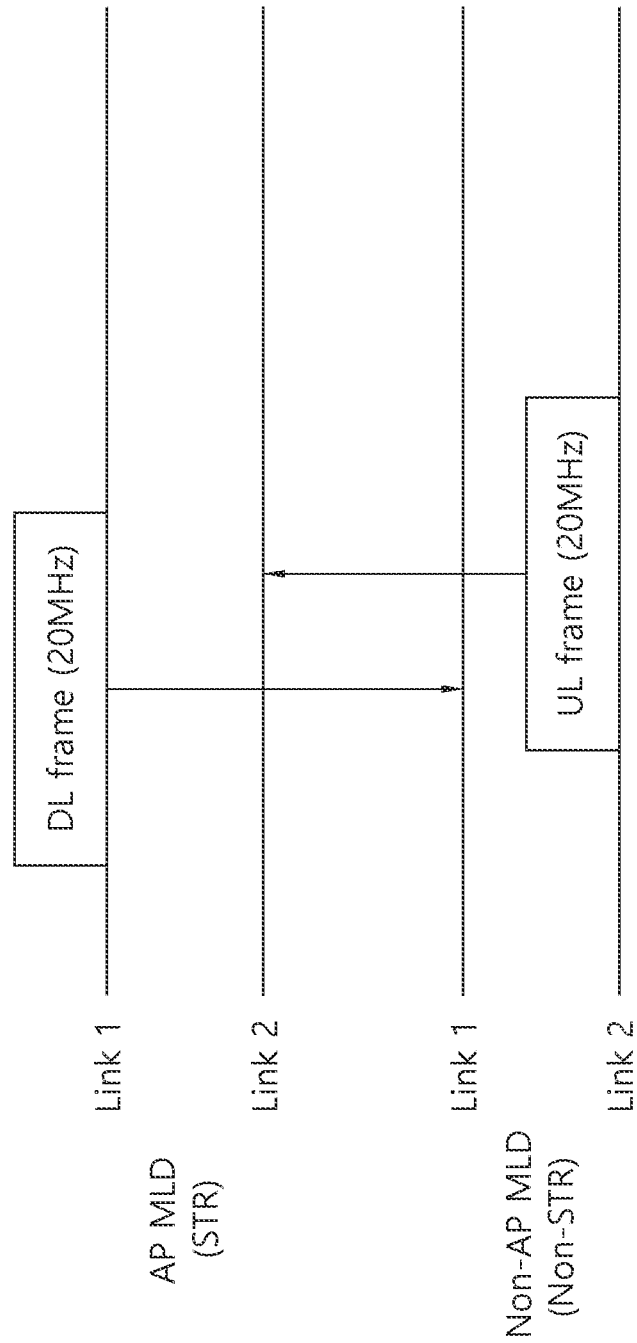
FIG. 20 shows an example of transmitting a UL SU frame in one link corresponding to non-STR when a DL frame is received in another link.

FIG. 20 shows an example of transmitting a UL SU frame in one link corresponding to non-STR when a DL frame is received in another link.

Referring to FIG. 20, for example, the terminal can determine that non-STR is operated when two links uses 80 MHz BW and STR is operated when 20 MHz BW is used. Therefore, the terminal may transmit the UL frame using a 20 MHz PPDU while receiving the DL frame in a 20 MHz band. In addition, according to the transmission bandwidth of the DL frame or the allocated RU size, the terminal may adjust the bandwidth and transmission power of the UL frame/UL PPDU to be transmitted to enable STR operation (e.g., reduce TX power). Non-STR non-AP MLD may set the bandwidth of the UL frame/PPDU to be transmitted based on the information notified to the AP MLD not to exceed the advertised information, and also set the TX power to not exceed the notified information.

Figure 21:
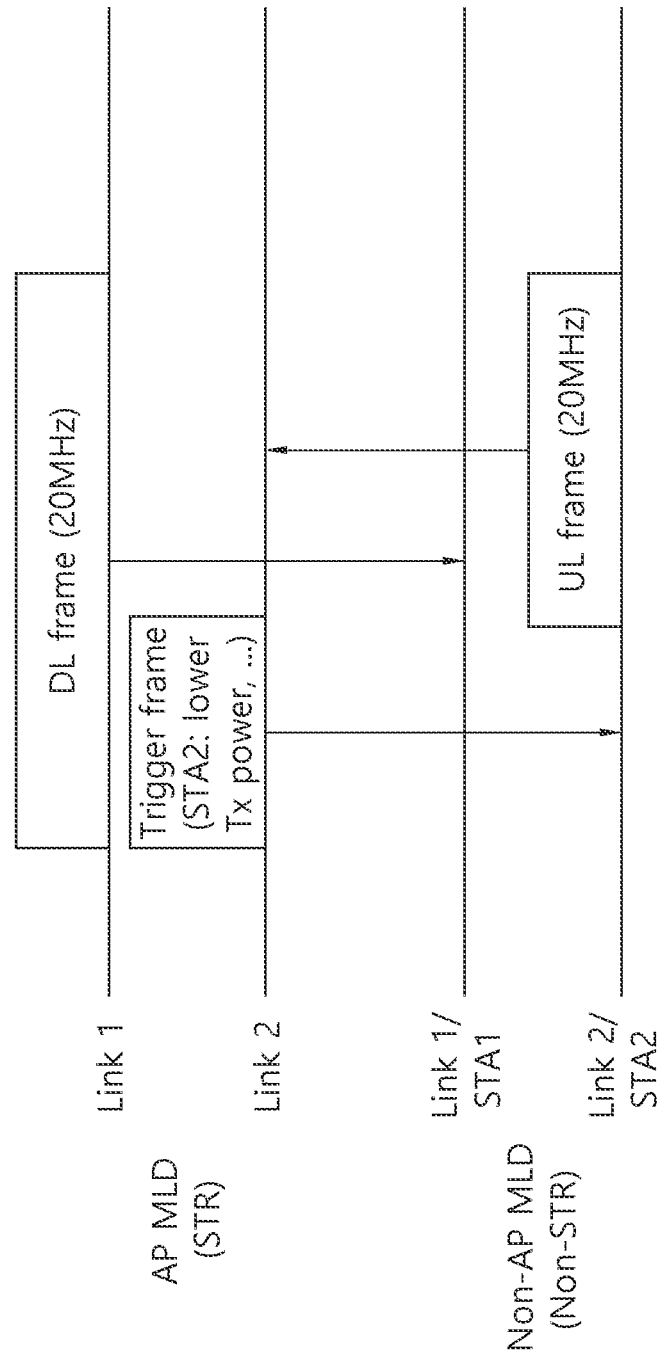
FIG. 21 is a diagram illustrating an embodiment of an STR operation in a non-STR link.

FIG. 21 is a diagram illustrating an embodiment of an STR operation in a non-STR link.

Referring to FIG. 21, the AP may use related parameters based on the STR enabled parameter set (e.g., links pair information, TX power, bandwidth, distance) received from the terminal in order to adjust the TX power of the terminal and allocate the RU to a position of an appropriate size before transmitting a trigger frame. For example, when the AP MLD transmits a trigger frame to the non-STR STA MLD, the AP MLD can reduce the power and allocate the UL resource to a location far from another link corresponding to the non-STR links pair.

For example, when the AP MLD is transmitting a DL frame to STA1 through link 1, the AP MLD may transmit a trigger frame through link 2 in order to trigger STA2 through link 2. At this time, when the STA2 transmits a UL frame with an original through link 2, the UL frame of link 2 may act as interference with the DL frame of link 1 since link 1 and link 2 have non-STR relationship. Accordingly, the AP MLD may instruct the non-AP MLD to lower the power of STA2 by using the trigger frame. STA2 may transmit the UL frame (i.e., trigger based (TB) PPDU) with a TX power adjusted based on the trigger frame. Since the STA2 lowers the power as indicated by the trigger frame, the UL frame transmission (i.e., TB PPDU transmission) may not affect the DL frame reception. That is, the non-AP MLD may operate in STR in link 1 and link 2.

If AP MLD wants to receive a TB PPPDU by triggering one STA (e.g., STA2) included in the same non-STR non-AP MLD through one link (e.g., link 2) while AP MLD is transmitting a DL frame to another STA (e.g., STA1) of non-STR non-AP MLD through another link (e.g., link 1), AP LMD may allocate a resource for transmitting the TB PPDU based on the recommended STA's TX power which enables the STR received from the non-AP MLD and bandwidth combination information of the two links. For example, among the values of information received by the AP MLD from the non-AP MLD, the STA's TX power is set to X-10 dBm, the corresponding bandwidth combination of the two links is '20 MHz and 20 MHz', and a DL frame having a bandwidth of 20 MHz is transmitted through link 1. To allocate UL resources of STA2 by using a trigger frame through link 2, AP MLD allocates UL RUs within a 20 MHz bandwidth, and designates the value of UL Target RSSI so that the TX power of STA2 has a value less than X-10 dBm. That is, the AP MLD provides bandwidth, transmission power, or UL RU allocation to the two links based on information such as the STA's maximum TX power that enables STR operation by STA MLD, PPDU bandwidth, and distance, etc. AP MLD can notify the information through the trigger frame.

For example, when the bandwidth combination for the two links is specified as '40 MHz, 40 MHz', AP MLD may allocate an appropriate UL RU within the 40 MHz bandwidth, not exceeding 40 MHz bandwidth (for example, secondary 40 MHz, secondary 80 MHz, secondary 160 MHz).

In addition, only when the received STA's TX Power value is greater than or equal to the TX power of the terminal whose UL Target RSSI subfield is adjusted by the AP, resource allocation can be made to the corresponding MLD. If the received Recommended STA's TX power is less than the TX power of the terminal whose UL Target RSSI subfield is adjusted by the AP, UL resources may not be allocated. If the TX power is set to a value smaller than the value of the TX power to be adjusted by the UL Target RSSI subfield, there is a high possibility that the TB PPDU transmitted by the UE cannot be properly received by the AP and the AP may not allocated UL resource by using the trigger frame.

NSTR (non-STR) STA MLD can calculate a path loss between the UE and AP based on AP TX power information included in the trigger frame. NSTR STA MLD can determine its own TX power (e.g., TX power=UL Target RSSI+ path loss) based on the target RSSI subfield in the trigger frame and the calculated path loss.

AP MLD needs to know the path loss with a terminal (i.e., NSTR STA MLD) in order to calculate whether a signal transmitted by the terminal satisfies the UL Target RSSI while satisfying the STR condition based on the TX power information in the capability (e.g., information for performing STR operation by the NSTR STA MLD, that is, information for STR operation).

NSTR STA MLD provides information for its own STR operation (that is, the STR enabled parameter set described above (e.g., (links pair information, Tx power, bandwidth, distance) list), etc.) to AP MLD. The AP MLD needs to know the path loss value with the NSTR STA MLD in order to check whether the NSTR STA MLD can transmit a signal to the AP MLD while satisfying the STR condition based on information for the NSTR STA MLD to perform the STR operation. If the AP MLD knows the path loss value with the NSTR STA MLD, the minimum TX power that the NSTR STA MLD should transmit to the AP MLD can be determined based on the path loss value and the UL Target RSSI (i.e., the signal strength required for the AP MLD to receive a signal). The maximum TX power value that the NSTR STA MLD can use to operate in STR should also be considered. Accordingly, if the maximum TX power value for the NSTR STA MLD to operate in STR is greater than the maximum TX power value to be transmitted to the AP MLD, the NSTR STA MLD can operate in STR with the AP MLD. Thus, for example, even if the AP MLD is transmitting a DL frame to the NSTR STA through link 1, the NSTR STA MLD may transmit a UL frame to the AP MLD through link 2.

Hereinafter, a method for computing the path loss is proposed.

Method 1: A terminal (i.e., NSTR STA MLD) may transmit a UL frame by including its TX power information before AP transmits a trigger frame.

Figure 22:
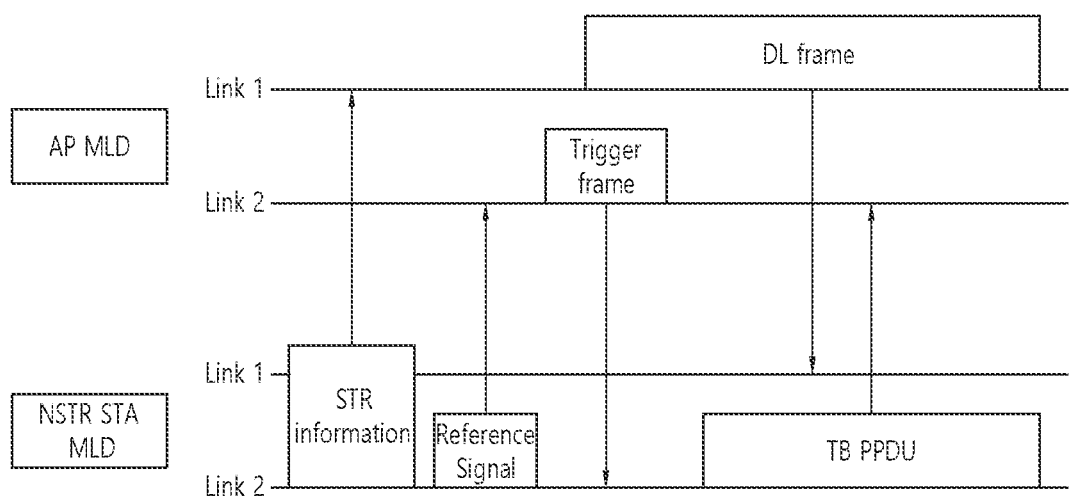
FIG. 22 is a diagram illustrating an embodiment of method 1.

FIG. 22 is a diagram illustrating an embodiment of method 1.

Referring to FIG. 22, the AP MLD may receive STR information from the NSTR STA MLD. For example, the AP MLD may receive STR information related to TX power for the NSTR STA MLD to operate in STR from the NSTR STA MLD. For example, the NSTR STA MLD includes first and second STAs, the first STA operates in a first link, the second STA operates in a second link, the first and second links may have in NSTR relationship.

For example, the STR information may include maximum TX power information that the NSTR STA MLD can operate in STR.

For example, the TX power for the NSTR STA MLD to operate in STR may vary according to the bandwidth of a transmission PPDU.

For example, the TX power for the NSTR STA MLD to operate in STR may vary according to a frequency interval between links.

For example, the STR information may include information based on FIGS. 14 to 21 and Tables 1 to 8.

For example, STR information may be included in an association request/response frame or ML association request/response frame. Alternatively, the STR information may be included in a specific frame.

For example, the STR information may be transmitted through the first link or the second link. That is, the AP MLD may receive the STR information through the first link or the second link.

AP may receive a reference signal (i.e., UL frame) including the TX power of the NSTR STA MLD. For example, the reference signal including the TX power of the NSTR STA MLD may be a data PPDU transmitted by the NSTR STA MLD, a beacon, or a signal transmitted for calculating a path loss. When the AP MLD receives the reference signal from the NSTR STA MLD, the AP MLD may calculate a path loss between the UE and the AP. That is, the path loss value may be calculated based on the difference between the strength of the received signal and the TX power. Based on the path loss value, the AP MLD may know the TX power (i.e., target RSSI+path loss) of the NSTR STA MLD corresponding to the UL target RSSI. That is, the AP MLD may know the minimum TX power value with which the NSTR STA MLD transmits in order for the AP MLD to successfully receive a signal from the NSTR STA MLD.

If the minimum TX power value corresponds to the TX power corresponding to the bandwidth combination to enable the STR of the NSTR STA MLD, the AP MLD may transmit a trigger frame to the NSTR STA MLD. That is, the AP MLD may transmit a trigger frame to the NSTR STA MLD if the minimum TX power with which AP MLD transmits to successfully receive a signal is less than the maximum TX power (e.g., the maximum TX power to enable the STR of the NSTR STA MLD). Upon receiving the trigger frame, the NSTR STA MLD may transmit a TB PPDU. Here, the NSTR STA MLD may receive a DL frame from the AP MLD in some link. Therefore, although uplink transmission cannot be performed with the conventional NSTR operation, if the above conditions are satisfied, UL transmission can be performed even during DL reception.

For example, if the TX power of the terminal corresponding to the UL Target RSSI is lower than or equal to the TX power for the combination that the terminal reports that the STR is possible, the AP may trigger the terminal to properly transmit the TB PPDU by including the corresponding UL Target RSSI when the AP allocates UL resource for TB PPDU transmission to the terminal in the trigger frame. That is, if the minimum TX power with which the NSTR STA MLD needs to transmit is less than or equal to the maximum TX power which enables STR of the NSTR STA MLD, the AP MLD may transmit a trigger frame to the NSTR STA MLD, and the trigger frame includes the UL Target RSSI of the AP MLD. The NSTR STA MLD may know the minimum TX power required by the AP MLD based on the UL Target RSSI, and may transmit the TB PPDU in consideration of both the minimum TX power and the maximum TX power available for the STR.

For example, if the TX power of the terminal corresponding to the UL Target RSSI is higher than the TX power for the combination that the NSTR STA MLD reports that the STR is possible, when the UL Target RSSI is included in the Trigger frame, the NSTR STA MLD If the TB PPDU is transmitted because STR is higher than the available power, it interferes with the reception of the DL frame of the other link, thereby interfering with the reception of the DL frame of the other link. That is, if the minimum transmit power that the NSTR STA MLD needs to transmit is greater than the maximum transmit power that the NSTR STA MLD can receive, reception of other links may be interrupted when the NSTR STA MLD transmits a signal with a strength that the AP MLD can receive.

Therefore, the AP MLD does not trigger the terminal when the TX power corresponding to the UL Target RSSI is higher than the power to enable the STR considering the bandwidth combination (that is, the AP does not transmit a trigger frame to the NSTR STA MLD). That is, the AP MLD may not include information (e.g., AID, etc.) on the NSTR STA MLD (or an STA included in the NSTR STA MLD) in the trigger frame.

Method 1-1: When NSTR STA MLD transmits a frame (e.g., association request/response frame or ML association request/response frame) including STR/NSTR Capability, NSTR STA MLD can inform the AP/AP MLD by including the TX power for the corresponding frame/PPDU as a form of element or field in the frame. A frame (e.g., association request/response frame or ML association request/response frame) including STR/NSTR Capability may further include TX power information, and the AP MLD receiving the frame may obtain a path loss value between NSTR STA MLD and AP MLD.

Method 1-2: When a terminal transmits a UL frame to an AP after the terminal performs multi-link setup and negotiation with the AP through a frame (e.g., association request/response frame or ML association request/response frame) including STR/NSTR capability information, the terminal can transmit a reference signal including TX power. At this time, the UL frame includes at least one of a QoS Data frame, a QoS Null frame, a control frame (e.g., RTS, CTS, MU-RTS, MU-CTS, Ack, BA, etc.), and a management frame (e.g., existing management frame, new management frame, existing action frame, new action frame). For example, when the TX power information is included in the QoS data or the QoS Null frame, the TX power information may be included in the A-Control field, the QoS Control field or the MAC header of the QoS data or the QoS Null frame.

In order to know the accurate path loss, it may be desirable to transmit just before the trigger frame transmission. For example, in the procedure of RTS [AP to STA]-CTS (Tx Power) [STA to AP]-trigger frame [AP to STA]-TB PPDU [STA to AP]-BlockAck (/M-BA) [AP to STA], TX Power may be included in the CTS before the trigger frame. In this case, TX power is included in the control frame.

For another example, in the procedure of trigger frame [AP to STA]-BSR (+Tx Power) [STA to AP]-trigger frame [AP to STA]-TB PPDU [STA to AP]-BlockAck (/M-BA), TX power may be included in the form of an A-Control field in the QoS Null frame including the BSR.

Method 2: The NSTR STA MLD may transmit a UL frame before the AP transmits a trigger frame, and the UL frame may include path loss information measured by the MSTR STA MLD. In this case, the path loss preferably has the most recently measured value, but is not limited thereto. When the AP receives a UL frame including path loss information from the terminal, the AP can calculate the TX power (i.e., =Target RSSI+path loss) corresponding to the UL Target RSSI desired by the AP based on the path loss information. If the TX power corresponds to the TX power corresponding to the bandwidth combination available for the STR, the AP transmits a trigger frame to the corresponding UE to request the TB PPDU transmission.

If the minimum TX power corresponds to the TX power corresponding to the bandwidth combination available for the STR of the NSTR STA MLD, the AP MLD may transmit a trigger frame to the NSTR STA MLD. That is, if the TX power available for the STR of the NSTR STA MLD is greater than the minimum TX power with which the NSTR STA MLD transmits in order for the AP MLD to successfully receive a signal from the NSTR STA MLD, the AP MLD may transmit a trigger frame to the NSTR STA MLD. Upon receiving the trigger frame, the NSTR STA MLD may transmit a TB PPDU. Here, the NSTR STA MLD may receive a DL frame from the AP MLD in some link.

Therefore, although uplink transmission cannot be performed with the conventional NSTR operation, if the above conditions are satisfied, UL transmission can be performed even during DL reception.

For example, if the TX power of the terminal corresponding to the UL Target RSSI is lower than or equal to the TX power for the combination that the terminal reports that the STR is possible, the AP may trigger the terminal to properly transmit the TB PPDU by including the corresponding UL Target RSSI when the AP allocates UL resource for TB PPDU transmission to the terminal in the trigger frame. That is, if the minimum TX power with which the NSTR STA MLD needs to transmit is less than or equal to the maximum TX power that enable STR of the NSTR STA MLD, the AP MLD may transmit a trigger frame to the NSTR STA MLD, and the trigger frame may include the UL Target RSSI of the AP MLD. The NSTR STA MLD may know the minimum TX power required by the AP MLD based on the UL Target RSSI, and may transmit the TB PPDU in consideration of both the minimum TX power and the maximum TX power available for the STR.

For example, if the TX power of the terminal corresponding to the UL Target RSSI is higher than the TX power for the combination that the NSTR STA MLD reports that the STR is possible and the UL Target RSSI is included in the trigger frame, the TB PPDU transmission of NSTR STA MLD interferes with the reception of the DL frame of the other link, thereby interfering with the reception of the DL frame of the other link since the TX power of the terminal is higher than a TX power available for the STR. That is, if the minimum TX power with which the NSTR STA MLD needs to transmit is greater than the maximum TX power that enable STR of the NSTR STA MLD, signal transmission of the NSTR STA MLD with a signal strength with which the AP can receive may interfere with a reception of another link.

Therefore, the AP MLD does not trigger the terminal when the TX power corresponding to the UL Target RSSI is higher than the TX power that enables STR considering the bandwidth combination (i.e., the trigger frame is not transmitted to the corresponding NSTR STA MLD). That is, the AP MLD may not include information (e.g., AID, etc.) on the NSTR STA MLD (or an STA included in the NSTR STA MLD) in the trigger frame.

Method 2-1: When a terminal transmits a frame (e.g., association request/response frame or ML association request/response frame) including STR/NSTR Capability, the terminal can inform the AP/AP MLD by including path loss information as a form of element or field in the frame. A frame (e.g., association request/response frame or ML association request/response frame) including STR/NSTR Capability may further include the path loss information, and the AP MLD receiving the frame may obtain a path loss value between NSTR STA MLD and AP MLD.

Method 2-2: When a terminal transmits a UL frame to an AP After the terminal performs multi-link setup and negotiation with the AP through a frame (e.g., association request/response frame or ML association request/response frame) including STR/NSTR capability information, the terminal can transmit the UL frame by including recently measured path loss information with the AP. At this time, the UL frame includes at least one of a QoS Data frame, a QoS Null frame, a control frame (e.g., RTS, CTS, MU-RTS, MU-CTS, Ack, BA, etc.), and a management frame (e.g., existing management frame, new management frame, existing action frame, new action frame). For example, when the path loss information is included in the QoS data or the QoS Null frame, the path loss information may be included in the A-Control field, the QoS Control field or the MAC header of the QoS data or the QoS Null frame. In order to measure a more accurate path loss, it is desirable to transmit the path loss just before the trigger frame transmission.

For example, in the procedure of DL frame [AP to STA]-UL frame (including path loss) [STA to AP]-Trigger frame [AP to STA]-TB PPDU [STA to AP]-BlockAck (/M-BA) [AP to STA], path loss information is included and transmitted in the UL frame (in particular, the UL response frame is preferable, but referred to as a UL frame) transmitted before the trigger frame. If the path loss cannot be calculated through the DL frame received before the UL frame transmission, the UL frame includes the most recently measured path loss. However, if the path loss can be calculated through the DL frame, the UL frame includes path loss information measured based on the DL frame. In order to calculate the path loss through the DL frame, the AP TX power is included in the corresponding DL frame like the existing trigger frame, and the terminal calculates the path loss based on the RSSI of the DL frame and the included AP TX power and transmits UL frame (especially UL response frame) including the calculated path loss.

[Procedure x-1] The AP can calculate the TX power of a terminal that matches the UL Target RSSI based on the path loss information included in the UL frame, and can transmits a trigger frame to the terminal for requesting TB PPDU transmission if the TX Power calculated as mentioned in Method 2 above UE is less than or equal to the TX power that the terminal reports that the STR is possible. When the AP receives the TB PPDU from the terminal, the AP may transmit a BA or Multi-STA BA to the terminal as a response.

For example, in procedure of RTS [AP to STA]-CTS (path loss) [STA to AP]-Trigger frame [AP to STA]-TB PPDU [STA to AP]-BlockAck (/M-BA) [AP to STA], the most recent path loss information may be included in the CTS before the trigger frame. That is, TX power may be included in a control frame. In order to include path loss information in the CTS frame, a modification of the CTS frame or a new type of CTS including path loss information needs to be defined. In this procedure, if the first DL frame (RTS in the above example) includes the TX Power of the sender, a receiver (STA) can calculate the path loss by measuring the received DL frame, and the response frame (CTS in the above example) of the first DL frame may include the calculated path loss. If the TX power of the sender is not included in the DL frame and thus the path loss cannot be calculated based on the DL frame, the terminal can transmit the recently measured path loss information in the UL frame. The remaining operations are the same as or similar to those of [Procedure x-1] described above.

For another example, in procedure of trigger frame [AP to STA]-BSR (+path loss) [STA to AP]-trigger frame [AP to STA]-TB PPDU [STA to AP]-BlockAck (/M-BA) [AP to STA], path loss information may be included in the form of an A-Control field of a QoS Null frame including BSR. Since the TX power of the sender (AP) is included in the trigger frame, the latest path loss measured based on the trigger frame is included in the response frame (BSR in this example) and transmitted. The remaining operations are the same as or similar to those of [Procedure x-1] described above.

Figure 23:
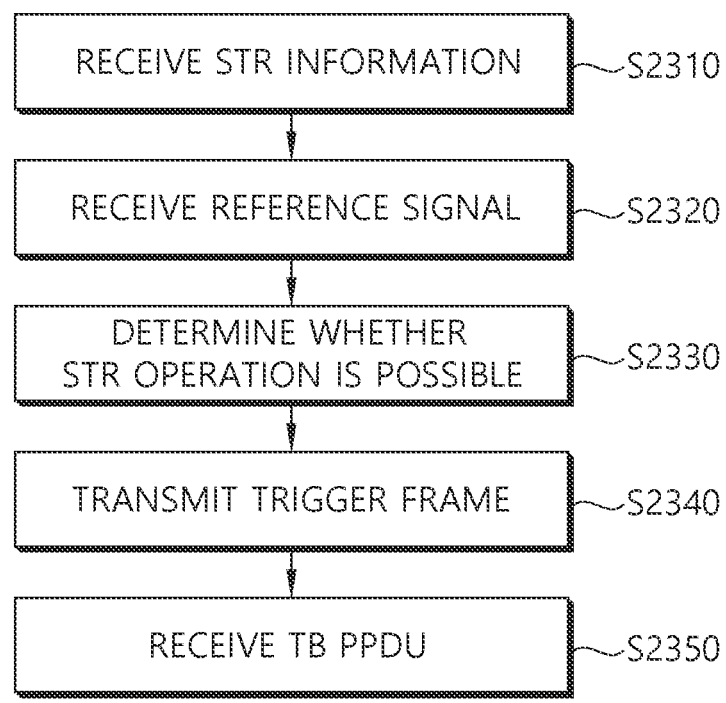
FIG. 23 is a diagram illustrating an embodiment of an AP MLD operation method.

FIG. 23 is a diagram illustrating an embodiment of an AP MLD operation method.

Referring to FIG. 23, an AP MLD may receive STR information (S2310). For example, the AP MLD may receive the STR information related to a TX power for the NSTR STA MLD to operate in STR from the NSTR STA MLD. For example, a NSTR STA MLD includes first and second STAs, the first STA operates in a first link, the second STA operates in a second link, and the first and second links may have NSTR relationship.

For example, the STR information may include maximum TX power information that the NSTR STA MLD can operate in STR.

For example, the TX power for the NSTR STA MLD to operate in STR may vary according to the bandwidth of a PPDU.

For example, the TX power for the NSTR STA MLD to operate in STR may vary according to a frequency interval between links.

For example, the STR information may include information based on FIGS. 14 to 21 and Tables 1 to 8.

For example, STR information may be included in an association request/response frame or ML association request/response frame. Alternatively, the STR information may be included in a specific frame.

The AP MLD may receive a reference signal (S2320). For example, the reference signal for calculating a path loss value between the NSTR STA MLD and the AP MLD may be received from the NSTR STA MLD. For example, the reference signal may include a TX power value of the reference signal.

For example, when the NSTR STA MLD transmits a frame (e.g., association request/response frame or ML association request/response frame) including STR/NSTR Capability, the TX power for the corresponding frame/PPDU may be included as a form of an element or field to inform the AP/AP MLD. That is, a frame including STR/NSTR Capability (e.g., association request/response frame or ML association request/response frame) may further include TX power information, and the AP MLD receiving the frame may obtain path loss value between NSTR STA MLD and AP MLD.

For example, the AP MLD may receive a reference signal (i.e., UL frame) including the TX power of the NSTR STA MLD. For example, the reference signal including the TX power of the NSTR STA MLD may be a data PPDU transmitted by the NSTR STA MLD, a beacon, or a signal transmitted separately for calculating path loss. When the AP MLD receives the reference signal from the NSTR STA MLD, the AP MLD may calculate a path loss between the terminal and the AP. That is, the path loss value may be calculated based on the difference between the strength of the received signal and the TX power. Based on the path loss value, the AP MLD may know the TX power (i.e., target RSSI+path loss) of the NSTR STA MLD corresponding to the UL target RSSI desired by the AP MLD. That is, the AP MLD may know the minimum TX power value with which the NSTR STA MLD needs to transmit in order for the AP MLD to successfully receive a signal from the NSTR STA MLD.

The AP MLD may determine whether the STR operation is possible (S2330). For example, the AP MLD may determine whether the NSTR STA MLD is capable of operating in STR based on the STR information and the path loss value.

For example, the AP MLD can calculate a minimum TX power value of the STA based on a RSSI related to a minimum TX power of the AP MLD to successfully receive a signal and the path loss value. For example, if the minimum TX power value is less than or equal to the maximum TX power value, the AP MLD may determine that the NSTR STA MLD is capable of operating in STR, and if the minimum TX power value is greater than the maximum TX power value, the AP MLD may determine that the STA MLD is not capable of operating in STR.

If the minimum TX power value corresponds to the TX power corresponding to the bandwidth combination available for the STR of the NSTR STA MLD, the AP MLD may transmit a trigger frame to the NSTR STA MLD. That is, if the TX power that enables STS of NSTR STA MLD is greater than the minimum TX power with which the NSTR STA MLD needs to transmit in order for the AP MLD to successfully receive a signal from the NSTR STA MLD, the AP MLD may transmit a trigger frame to the NSTR STA MLD. Upon receiving the trigger frame, the NSTR STA MLD may transmit a TB PPDU. Here, the NSTR STA MLD may receive a DL frame from the AP MLD in some link. Therefore, although uplink transmission cannot be performed with the conventional NSTR operation, if the above conditions are satisfied, UL transmission can be performed even during DL reception.

For example, if the TX power of the terminal corresponding to the UL Target RSSI is lower than or equal to the TX power for the combination that the terminal reports that the STR is possible, the AP may trigger the terminal to properly transmit the TB PPDU by including the corresponding UL Target RSSI when the AP allocates UL resource for TB PPDU transmission to the terminal in the trigger frame. That is, if the minimum TX power with which the NSTR STA MLD needs to transmit is less than or equal to the maximum TX power that enables STR of the NSTR STA MLD, the AP MLD may transmit a trigger frame to the NSTR STA MLD, and the trigger frame may include the UL Target RSSI of the AP MLD. The NSTR STA MLD may know the minimum TX power required by the AP MLD based on the UL Target RSSI, and may transmit the TB PPDU in consideration of both the minimum TX power and the maximum TX power available for the STR.

For example, if the TX power of the terminal corresponding to the UL Target RSSI is higher than the TX power for the combination that the NSTR STA MLD reports that the STR is possible and the UL Target RSSI is included in the trigger frame, the TB PPDU transmission of NSTR STA MLD interferes with the reception of the DL frame of the other link, thereby interfering with the reception of the DL frame of the other link since the TX power of the terminal is higher than a TX power available for the STR. That is, if the minimum TX power with which the NSTR STA MLD needs to transmit is greater than the maximum TX power that enable STR of the NSTR STA MLD, signal transmission of the NSTR STA MLD with a signal strength with which the AP can receive may interfere with a reception of another link.

The AP MLD may transmit a trigger frame (S2340). For example, the AP MLD transmits a PPDU to the NSTR STA MLD through the first link, and based on the NSTR STA MLD being capable of operating in STR, transmits a trigger frame to the NSTR STA MLD through the second link.

For example, the trigger frame may further include RSSI information related to the minimum TX power of the AP MLD to successfully receive a signal.

The AP MLD may receive a TB PPDU (S2350). For example, the AP MLD may receive the TB PPDU from the NSTR STA MLD through the second link. Although the NSTR STA MLD basically operates in NSTR, the NSTR STA MLD can turn into STR under certain conditions. Because the corresponding condition is satisfied, the NSTR STA MLD can transmit the TB PPDU on the second link while receiving a PPDU on the first link.

Figure 24:
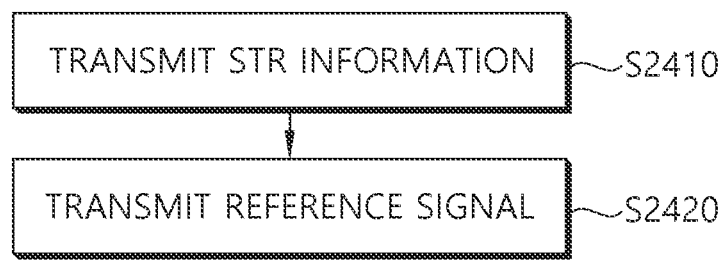
FIG. 24 is a diagram illustrating an embodiment of a method of operating an NSTR STA MILD.

FIG. 24 is a diagram illustrating an embodiment of a method of operating an NSTR STA MLD.

Referring to FIG. 24, an NSTR STA MLD may transmit STR information (S2410). For example, the NSTR STA MLD may transmit the STR information related to TX power for the NSTR STA MLD to operate in STR to the AP MLD. For example, the NSTR STA MLD includes first and second STAs, the first STA operates in a first link, and the second STA operates in a second link, and the first and second links may have NSTR relationship.

For example, the STR information may include maximum TX power information that enables STR of the NSTR STA MLD.

For example, the TX power for the NSTR STA MLD to operate in TR may vary according to the bandwidth of a PPDU.

For example, the TX power for the NSTR STA MLD to operate in STR may vary according to a frequency interval between links.

For example, the STR information may include information based on FIGS. 14 to 21 and Tables 1 to 8.

For example, STR information may be included in an association request/response frame or ML association request/response frame. Alternatively, the STR information may be included in a specific frame.

The NSTR STA MLD may transmit a reference signal (S2420). For example, the NSTR STA MLD may transmit a reference signal for calculating a path loss value between the NSTR STA MLD and the AP MLD. For example, the reference signal may include a TX power value of the reference signal.

For example, when the NSTR STA MLD transmits a frame (e.g., association request/response frame or ML association request/response frame) including STR/NSTR Capability, the TX power for the corresponding frame/PPDU may be included as a form of an element or field form to inform the AP/AP MLD. That is, a frame (e.g., association request/response frame or ML association request/response frame) including STR/NSTR Capability may further include TX power information, and the AP MLD receiving the frame may obtain a path loss value between the NSTR STA MLD and the AP MLD.

For example, the AP MLD may receive a reference signal (i.e., UL frame) including the TX power of the NSTR STA MLD. For example, the reference signal including the TX power of the NSTR STA MLD may be a data PPDU transmitted by the NSTR STA MLD, a beacon, or a signal transmitted separately for calculating path loss. When the AP MLD receives the reference signal from the NSTR STA MLD, the AP MLD may calculate a path loss between the terminal and the AP. That is, the path loss value may be calculated based on the difference between the strength of the received signal and the TX power. Based on the path loss value, the AP MLD may know the TX power (i.e., target RSSI+path loss) of the NSTR STA MLD corresponding to the UL target RSSI desired by the AP MLD. That is, the AP MLD may know the minimum TX power value with which that the NSTR STA MLD needs to transmit in order for the AP MLD to successfully receive a signal from the NSTR STA MLD.

The AP MLD may determine whether the STR operation is possible. For example, the AP MLD may determine whether the NSTR STA MLD is capable of operating in STR based on the STR information and the path loss value.

For example, the AP MLD can calculate a minimum TX power value of the STA based on a RSSI related to a minimum TX power of the AP MLD to successfully receive a signal and the path loss value. For example, if the minimum TX power value is less than or equal to the maximum TX power value, the AP MLD may determine that the NSTR STA MLD is capable of operating in STR, and if the minimum TX power value is greater than the maximum TX power value, the AP MLD may determine that the STA MLD is not capable of operating in STR.

If the minimum TX power value corresponds to the TX power corresponding to the bandwidth combination available for the STR of the NSTR STA MLD, the AP MLD may transmit a trigger frame to the NSTR STA MLD. That is, if the TX power that enables STS of NSTR STA MLD (i.e., a maximum TX power that enables STS of NSTR STA MLD) is greater than the minimum TX power with which the NSTR STA MLD needs to transmit in order for the AP MLD to successfully receive a signal from the NSTR STA MLD, the AP MLD may transmit a trigger frame to the NSTR STA MLD. Upon receiving the trigger frame, the NSTR STA MLD may transmit a TB PPDU. Here, the NSTR STA MLD may receive a DL frame from the AP MLD in some link. Therefore, although uplink transmission cannot be performed with the conventional NSTR operation, if the above conditions are satisfied, UL transmission can be performed even during DL reception.

For example, if the TX power of the terminal corresponding to the UL Target RSSI is lower than or equal to the TX power for the combination that the terminal reports that the STR is possible, the AP may trigger the terminal to properly transmit the TB PPDU by including the corresponding UL Target RSSI when the AP allocates UL resource for TB PPDU transmission to the terminal in the trigger frame. That is, if the minimum TX power with which the NSTR STA MLD needs to transmit is less than or equal to the maximum TX power that enables STR of the NSTR STA MLD, the AP MLD may transmit a trigger frame to the NSTR STA MLD, and the trigger frame may include the UL Target RSSI of the AP MLD. The NSTR STA MLD may know the minimum TX power required by the AP MLD based on the UL Target RSSI, and may transmit the TB PPDU in consideration of both the minimum TX power and the maximum TX power available for the STR.

For example, if the TX power of the terminal corresponding to the UL Target RSSI is higher than the TX power for the combination that the NSTR STA MLD reports that the STR is possible and the UL Target RSSI is included in the trigger frame, the TB PPDU transmission of NSTR STA MLD interferes with the reception of the DL frame of the other link, thereby interfering with the reception of the DL frame of the other link since the TX power of the terminal is higher than a TX power available for the STR. That is, if the minimum TX power with which the NSTR STA MLD needs to transmit is greater than the maximum TX power that enable STR of the NSTR STA MLD, signal transmission of the NSTR STA MLD with a signal strength with which the AP can receive may interfere with a reception of another link.

The NSTR STA MLD may receive a trigger frame. For example, the NSTR STA MLD receive a PPDU from the AP MLD through the first link, and based on the NSTR STA MLD being capable of operating in STR, receives a trigger frame from the AP MLD through the second link.

For example, the trigger frame may further include RSSI information related to the minimum TX power of the AP MLD to successfully receive a signal.

The NSTR STA MLD may transmit a TB PPDU. For example, the NSTR STA MLD may transmit the TB PPDU to the AP MLD through the second link. Although the NSTR STA MLD basically operates in NSTR, the NSTR STA MLD can turn into STR under certain conditions. Because the corresponding condition is satisfied, the NSTR STA MLD can transmit the TB PPDU on the second link while receiving a PPDU on the first link.

Some of the detailed steps shown in the example of FIGS. 23 and 24 may not be essential steps and may be omitted. In addition to the steps shown in FIGS. 23 and 24, other steps may be added, and the order of the steps may vary. Some of the above steps may have their own technical meaning.

The technical features of the present specification described above may be applied to various apparatuses and methods. For example, the above-described technical features of the present specification may be performed/supported through the apparatus of FIGS. 1 and/or 10. For example, the technical features of the present specification described above may be applied only to a part of FIGS. 1 and/or 10. For example, the technical features of the present specification described above are implemented based on the processing chips 114 and 124 of FIG. 1, or implemented based on the processors 111 and 121 and the memories 112 and 122 of FIG. 1, or may be implemented based on the processor 610 and the memory 620 of FIG. 10. For example, in the apparatus of the present specification, the processor may receive STR information related to TX power for the NSTR STA MLD to operate in STR from an NSTR STA MLD. The NSTR STA MLD includes first and second STAs, the first STA operates on a first link, the second STA operates on a second link, and the first and second links have NSTR relationship. The processor may receive, from the NSTR STA MLD, a reference signal for calculating a path loss value between the NSTR STA MLD and the AP MLD. The reference signal may include a TX power value of the reference signal. And the processor may be configured to determine whether the NSTR STA MLD is capable of operating in STR based on the STR information and the path loss value.

The technical features of the present specification may be implemented based on a computer readable medium (CRM). For example, a CRM proposed by the present specification includes at least one instruction based on being executed by at least one processor of the AP MLD of a WLAN system. An NSTR STA MLD includes first and second STAs, the first STA operates in a first link, the second STA operates in a second link, and the first and second links have NSTR relationship. At least one instruction includes receiving STR information related to TX power for the NSTR STA MLD to operate in STR from the NSTR STA MLD; receiving, from the NSTR STA MLD, a reference signal for calculating a path loss value between the NSTR STA MLD and the AP MLD, and determining whether the NSTR STA MLD is capable of operating in STR based on the STR information and the path loss value. The reference signal includes a TX power value of the reference signal;

The instructions stored in the CRM of the present specification may be executed by at least one processor. At least one processor related to CRM in the present specification may be the processors 111 and 121 or the processing chips 114 and 124 of FIG. 1, or the processor 610 of FIG. 10. Meanwhile, the CRM of the present specification may be the memories 112 and 122 of FIG. 1, the memory 620 of FIG. 10, or an external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims set forth herein may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method for a wireless local area network system, the method performed by an access point (AP) multi-link device (MLD) and comprising:
receiving, from a non-simultaneous transmit and receive (NSTR) station MLD (NSTR STA MLD), a Multi-Link element including transmit power information for the NSTR STA MLD to operate in STR based on a simultaneous transmit and receive (STR) mode, wherein the NSTR STA MLD includes a first STA and a second STA, the first STA operating in a first link, the second STA operating in a second link, wherein the first and second links are part of an NSTR link pair, wherein the Multi-Link element further includes frequency separation information for the STR mode, maximum link number information of the NSTR STA MLD, and Traffic Identifier (TID) mapping information of the NSTR STA MLD, wherein the frequency separation information is related to a frequency distance between the first and second links for operating based on the STR mode, wherein the maximum link number information is related to a number of maximum links supported by the NSTR STA MLD, and wherein the TID mapping information is related to at least one TID allowed to be exchanged on the first and second links;
receiving, from the NSTR STA MLD, a reference signal to calculate a path loss value between the NSTR STA MLD and the AP MLD, the reference signal including a transmit power value of the reference signal; and
determining, based on the Multi-Link element and the path loss value, whether the NSTR STA MLD is allowed to operate based on the STR mode.

2. The method of claim 1, wherein the transmit power information includes a maximum transmit power information for operating based on the STR mode.

3. The method of claim 2, further comprising:
calculating a minimum transmit power value of the NSTR STA MLD based on the path loss value and a received signal strength indicator (RSSI) related to a minimum transmit power for the AP MLD to receive a signal successfully;
determining that the NSTR STA MLD is allowed to operate based on the STR mode based on the minimum transmit power value being less than or equal to a maximum transmit power value; and
determining that the NSTR STA MLD is allowed to operate based on the STR mode based on the minimum transmit power value being larger than the maximum transmit power value.

4. An access point (AP) multi-link device (MLD) for a wireless local area network system, the AP MLD comprising:
a transceiver configured to transmit and receive radio signals; and
a processor operatively coupled with the transceiver and configured to:
receive, from a non-simultaneous transmit and receive (NSTR) station MLD (NSTR STA MLD), a Multi-Link element including related to transmit power information for the NSTR STA MLD to operate based on a simultaneous transmit and receive (STR) mode, wherein the NSTR STA MLD includes a first STA and a second STA, the first STA operating in a first link, the second STA operating in a second link, wherein the first and second links are part of an NSTR link pair, wherein the Multi-Link element further includes frequency separation information for the STR mode, maximum link number information of the NSTR STA MLD, and Traffic Identifier (TID) mapping information of the NSTR STA MLD, wherein the frequency separation information is related to a frequency distance between the first and second links for operating based on the STR mode, wherein the maximum link number information is related to a number of maximum links supported by the NSTR STA MLD, and wherein the TID mapping information is related to at least one TID allowed to be exchanged on the first and second links;
receive, from the NSTR STA MLD, a reference signal to calculate a path loss value between the NSTR STA MLD and the AP MLD, the reference signal including a transmit power value of the reference signal; and
determine, based on the Multi-Link element and the path loss value, whether the NSTR STA MLD is allowed to operate based on the STR mode.

5. The AP MLD of claim 4, wherein transmit power includes a maximum transmit power information for operating based on the STR mode.

6. The AP MLD of claim 5, wherein the processor is further configured to:
calculate a minimum transmit power value of the NSTR STA MLD based on the path loss value and a received signal strength indicator (RSSI) related to a minimum transmit power for the AP MLD to receive a signal successfully;
determine that the NSTR STA MLD is allowed to operate based on the STR mode based on the minimum transmit power value being less than or equal to a maximum transmit power value; and
determine that the NSTR STA MLD is allowed to operate based on the STR mode based on the minimum transmit power value being larger than the maximum transmit power value.

7. A method for a wireless local area network system, the method performed by a non-simultaneous transmit and receive (NSTR) station multi-link device (MLD) (NSTR STA MLD) and comprising:
transmitting, to an access point (AP) multi-link device (MLD), a Multi-Link element including transmit power information for the NSTR STA MLD to operate based on a simultaneous transmit and receive (STR) mode, wherein the NSTR STA MLD includes a first STA and a second STA, the first STA operating in a first link, the second STA operating in a second link, wherein the first and second links are part of an NSTR link pair, wherein the Multi-Link element further includes frequency separation information for the STR mode, maximum link number information of the NSTR STA MLD, and Traffic Identifier (TID) mapping information of the NSTR STA MLD, wherein the frequency separation information is related to a frequency distance between the first and second links for operating based on the STR mode, wherein the maximum link number information is related to a number of maximum links supported by the NSTR STA MLD, and wherein the TID mapping information is related to at least one TID allowed to be exchanged on the first and second links; and
transmitting, to the AP MLD, a reference signal to calculate a path loss value between the NSTR STA MLD and the AP MLD, the reference signal including a transmit power value of the reference signal.

* * * * *